US012698085B1

(12) United States Patent
Caprario et al.

(10) Patent No.: US 12,698,085 B1
(45) Date of Patent: Aug. 4, 2026

(54) AIRCRAFT PROPULSION SYSTEM WITH SIDE FLOWPATH INLET(S)

(71) Applicant: RTX Corporation, Farmington, CT (US)

(72) Inventors: Joseph T. Caprario, Rocky Hill, CT (US); Jeffrey T. Morton, Manchester, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/079,893

(22) Filed: Mar. 14, 2025

(51) Int. Cl.
*B64D 27/10* (2006.01)
*F02C 9/20* (2006.01)

(52) U.S. Cl.
CPC ............... *B64D 27/10* (2013.01); *F02C 9/20* (2013.01); *F05D 2220/323* (2013.01)

(58) Field of Classification Search
CPC .......... F01D 7/00; F01D 17/105; F01D 17/00; F02C 9/16; F02C 9/18; F02C 9/20; B64D 27/10; B64D 2027/005; F02K 1/54
See application file for complete search history.

(56) References Cited

U.S. PATENT DOCUMENTS

| | | | |
|---|---|---|---|
| 4,732,538 A | 3/1988 | Wollenweber | |
| 4,751,816 A | 6/1988 | Perry | |
| 4,976,102 A | 12/1990 | Taylor | |
| 5,039,278 A | 8/1991 | Wakeman | |
| 8,974,175 B2 | 3/2015 | Domercq | |
| 9,228,535 B2 | 1/2016 | Magowan | |
| 11,753,965 B1* | 9/2023 | Ganji | F01D 25/24 60/785 |
| 2011/0041511 A1* | 2/2011 | Bradbrook | F02C 7/275 60/778 |
| 2017/0218841 A1* | 8/2017 | Nestico | F01D 17/14 |
| 2021/0108595 A1* | 4/2021 | Khalid | F04D 29/563 |

* cited by examiner

*Primary Examiner* — Andrew H Nguyen
(74) *Attorney, Agent, or Firm* — Getz Balich LLC

(57) ABSTRACT

An aircraft system includes an open propulsor rotor, an engine core, an engine flowpath and a flow regulator. The open propulsor rotor includes a plurality of open propulsor blades arranged circumferentially about an axis. Each of the open propulsor blades is disposed in an external environment. The engine core includes a compressor section, a combustor section and a turbine section. The engine flowpath includes an end flowpath inlet, a side flowpath inlet and a flowpath exhaust. The engine flowpath extends longitudinally through the compressor section, the combustor section and the turbine section from the end flowpath inlet to the flowpath exhaust. The side flowpath inlet is disposed to a radial outer side of the engine flowpath longitudinally between the end flowpath inlet and the compressor section. The flow regulator is configured to regulate a flow of air from the external environment into the engine flowpath through the side flowpath inlet.

20 Claims, 18 Drawing Sheets

AIRCRAFT PROPULSION SYSTEM WITH SIDE FLOWPATH INLET(S)

BACKGROUND OF THE DISCLOSURE

1. Technical Field

This disclosure relates generally to an aircraft and, more particularly, to a propulsion system for the aircraft.

2. Background Information

Various types and configurations of propulsion systems for an aircraft are known in the art, including open rotor propulsion systems. While these known aircraft propulsion systems have various benefits, there is still room in the art for improvement.

SUMMARY OF THE DISCLOSURE

According to an aspect of the present disclosure, a propulsion system is provided for an aircraft. This propulsion system includes an open propulsor rotor, an engine core, an engine flowpath and a flow regulator. The open propulsor rotor includes a plurality of open propulsor blades arranged circumferentially about a propulsion system axis. Each of the open propulsor blades is disposed in an environment external to the propulsion system. The engine core is configured to drive rotation of the open propulsor rotor about the propulsion system axis. The engine core includes a compressor section, a combustor section and a turbine section. The engine flowpath includes an end flowpath inlet, a side flowpath inlet and a flowpath exhaust. The engine flowpath extends longitudinally through the compressor section, the combustor section and the turbine section from the end flowpath inlet to the flowpath exhaust. The side flowpath inlet is disposed to a radial outer side of the engine flowpath longitudinally between the end flowpath inlet and the compressor section. The flow regulator is configured to regulate a flow of air from the environment external to the propulsion system into the engine flowpath through the side flowpath inlet.

According to another aspect of the present disclosure, another propulsion system is provided for an aircraft. This propulsion system includes an open propulsor rotor, an engine core, an engine flowpath and a flow regulator. The open propulsor rotor includes a plurality of open propulsor blades arranged circumferentially about a propulsion system axis. Each of the open propulsor blades is disposed in an environment external to the propulsion system. The engine core is configured to drive rotation of the open propulsor rotor about the propulsion system axis. The engine core includes a compressor section, a combustor section and a turbine section. The engine flowpath includes a flowpath inlet and a flowpath exhaust. The engine flowpath extends longitudinally through the compressor section, the combustor section and the turbine section between the flowpath inlet and the flowpath exhaust. The flow regulator is configured to: close the flowpath inlet into the engine flowpath from the environment external to the propulsion system when the open propulsor rotor is configured to provide forward thrust; and open the flowpath inlet into the engine flowpath from the environment external to the propulsion system when the open propulsor rotor is configured to provide reverse thrust.

According to still another aspect of the present disclosure, another propulsion system is provided for an aircraft. This propulsion system includes an open propulsor rotor, an engine core, an engine flowpath and a flow regulator. The open propulsor rotor includes a plurality of open propulsor blades arranged circumferentially about a propulsion system axis. Each of the open propulsor blades is disposed in an environment external to the propulsion system. The engine core is configured to drive rotation of the open propulsor rotor about the propulsion system axis. The engine core includes a compressor section, a combustor section and a turbine section. The engine flowpath includes a flowpath inlet and a flowpath exhaust. The engine flowpath extends longitudinally through the compressor section, the combustor section and the turbine section between the flowpath inlet and the flowpath exhaust. The flow regulator is operatively coupled to a first of the open propulsor blades. The flow regulator is configured to selectively regulate a flow of air from the environment external to the propulsion system into the engine flowpath through the flowpath inlet.

The end flowpath inlet may be an annular inlet extending circumferentially around the propulsion system axis.

A leg of the engine flowpath may project axially along the propulsion system axis into the propulsion system from the end flowpath inlet.

A leg of the engine flowpath may project radially inward towards the propulsion system axis into the propulsion system from the side flowpath inlet.

The open propulsor blades may be disposed axially between the end flowpath inlet and the side flowpath inlet along the propulsion system axis.

The side flowpath inlet may be a non-annular inlet.

The side flowpath inlet may be one of a plurality of side flowpath inlets into the engine flowpath. The side flowpath inlets may be arranged circumferentially about the propulsion system axis. Each of the side flowpath inlets may be disposed to the radial outer side of the engine flowpath longitudinally between the end flowpath inlet and the compressor section.

The flow regulator may be one of a plurality of flow regulators. Each of the flow regulators may be configured to regulate a respective flow of the air from the environment external to the propulsion system into the engine flowpath through a respective one of the side flowpath inlets.

The flow regulators may include a first flow regulator and a second flow regulator. The first flow regulator may include a first door with a first geometry. The first door may be configured to selectively cover and uncover a first of the side flowpath inlets. The second flow regulator may include a second door with a second geometry. The second door may be configured to selectively cover and uncover a second of the side flowpath inlets. The second geometry may be different than the first geometry.

At least two of the flow regulators may include a door with a common geometry. The door of each of the at least two of the flow regulators may be configured to selectively cover and uncover the respective one of the side flowpath inlets.

The propulsion system may also include an actuation system operatively coupled to the flow regulators. The actuation system may be configured to actuate the flow regulators to synchronously open and close the side flowpath inlets.

The propulsion system may also include an actuation system operatively coupled to the flow regulators. The actuation system may be configured to actuate the flow regulators to asynchronously open and close at least two of the side flowpath inlets.

The side flowpath inlets may include a first side flowpath inlet and a second side flowpath inlet. The first side flowpath inlet may have a first geometry. The second side flowpath inlet may have a second geometry that is different from the first geometry.

At least two of the side flowpath inlets may have a common geometry.

The flow regulator may include a door configured to selectively cover and uncover the side flowpath inlet. The door may be adjacent to a first of the open propulsor blades.

The flow regulator may include a door configured to selectively cover and uncover the side flowpath inlet. The door may be operatively coupled to a first of the open propulsor blades.

The flow regulator may include a door configured to selectively cover and uncover the side flowpath inlet. The door may be adjacent a first of the open propulsor blades. The door may be operatively independent of each of the open propulsor blades.

The propulsion system may also include an open guide vane structure. The open guide vane structure may include a plurality of open guide vanes. Each of the open guide vanes may be disposed in the environment external to the propulsion system. The side flowpath inlet may be disposed axially between the open propulsor blades and the open guide vane structure along the propulsion system axis.

The propulsion system may also include an actuation system configured to actuate the flow regulator such that the flow regulator: blocks the flow of the air from the environment external to the propulsion system into the engine flowpath through the side flowpath inlet when the open propulsor rotor is configured to provide forward thrust; and unblocks the flow of the air from the environment external to the propulsion system into the engine flowpath through the side flowpath inlet when the open propulsor rotor is configured to provide reverse thrust.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
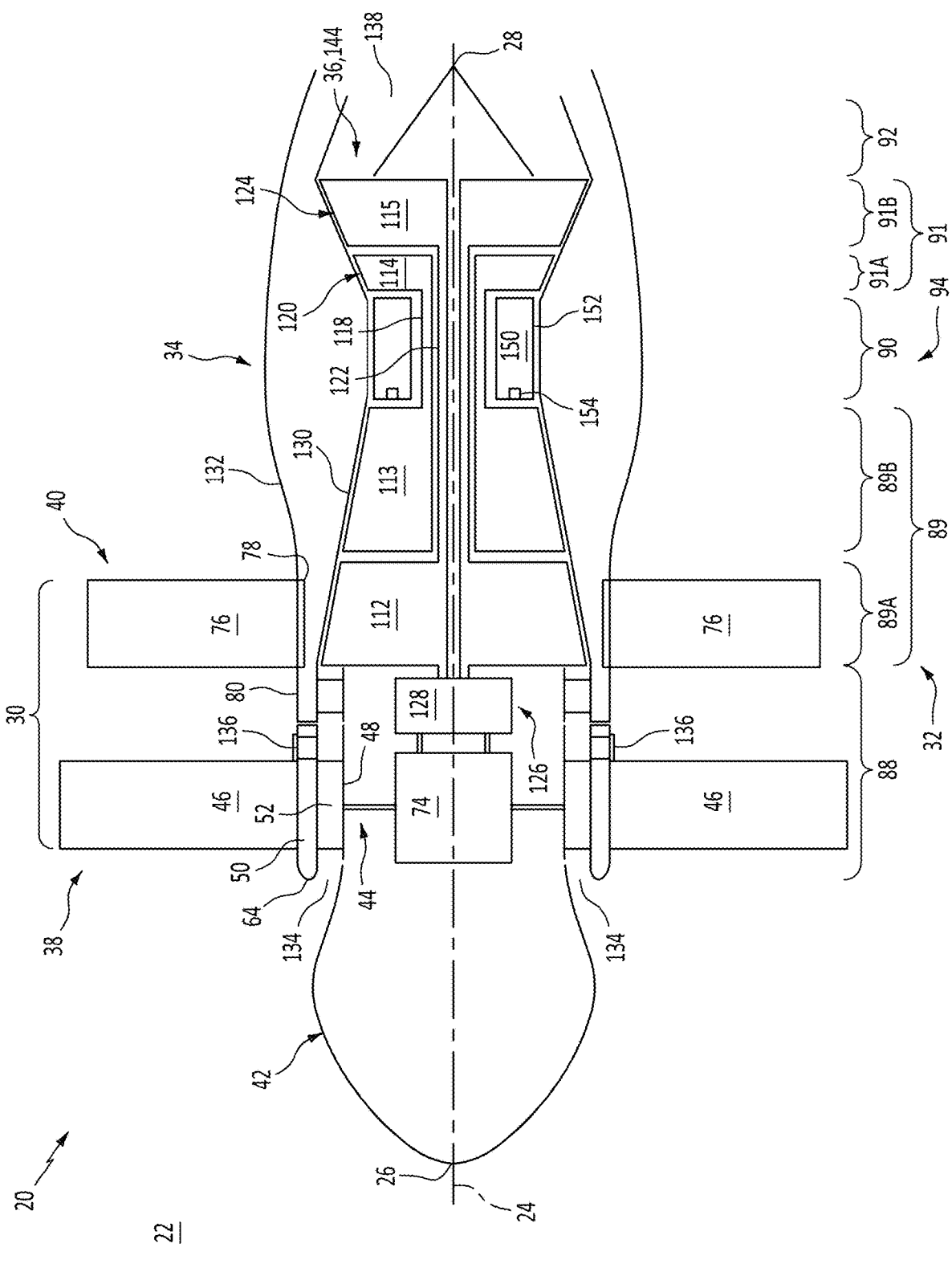
FIG. 1 is a schematic sectional illustration of an aircraft propulsion system.

FIG. 1 is a schematic illustration of a propulsion system 20 for an aircraft. The aircraft may be an airplane, a drone (e.g., an unmanned aerial vehicle (UAV)), or any other manned or unmanned aerial vehicle or system. The aircraft propulsion system 20 may be configured as an open rotor propulsion system with a single open rotor and swirl recovery vane (SRV) architecture. Herein, the term "open" may describe a propulsion system section and/or a propulsion system component which is open to an environment 22 (e.g., an ambient environment) external to the aircraft propulsion system 20 and, more generally, the aircraft.

The aircraft propulsion system 20 extends axially along an axis 24 between an upstream, forward end 26 of the aircraft propulsion system 20 and a downstream, aft end 28 of the aircraft propulsion system 20. The propulsion system axis 24 may be a centerline axis of the aircraft propulsion system 20 and/or a centerline axis of one or more members of the aircraft propulsion system 20. The propulsion system axis 24 may also or alternatively be a rotational axis of one or more members of the aircraft propulsion system 20. The aircraft propulsion system 20 of FIG. 1 includes an open rotor propulsion section 30 (e.g., an open rotor propulsion module) and a gas turbine engine 32. This aircraft propulsion system 20 also includes a stationary housing structure 34 and an engine flowpath 36 (e.g., an annular core flowpath) for the turbine engine 32.

Figure 2:
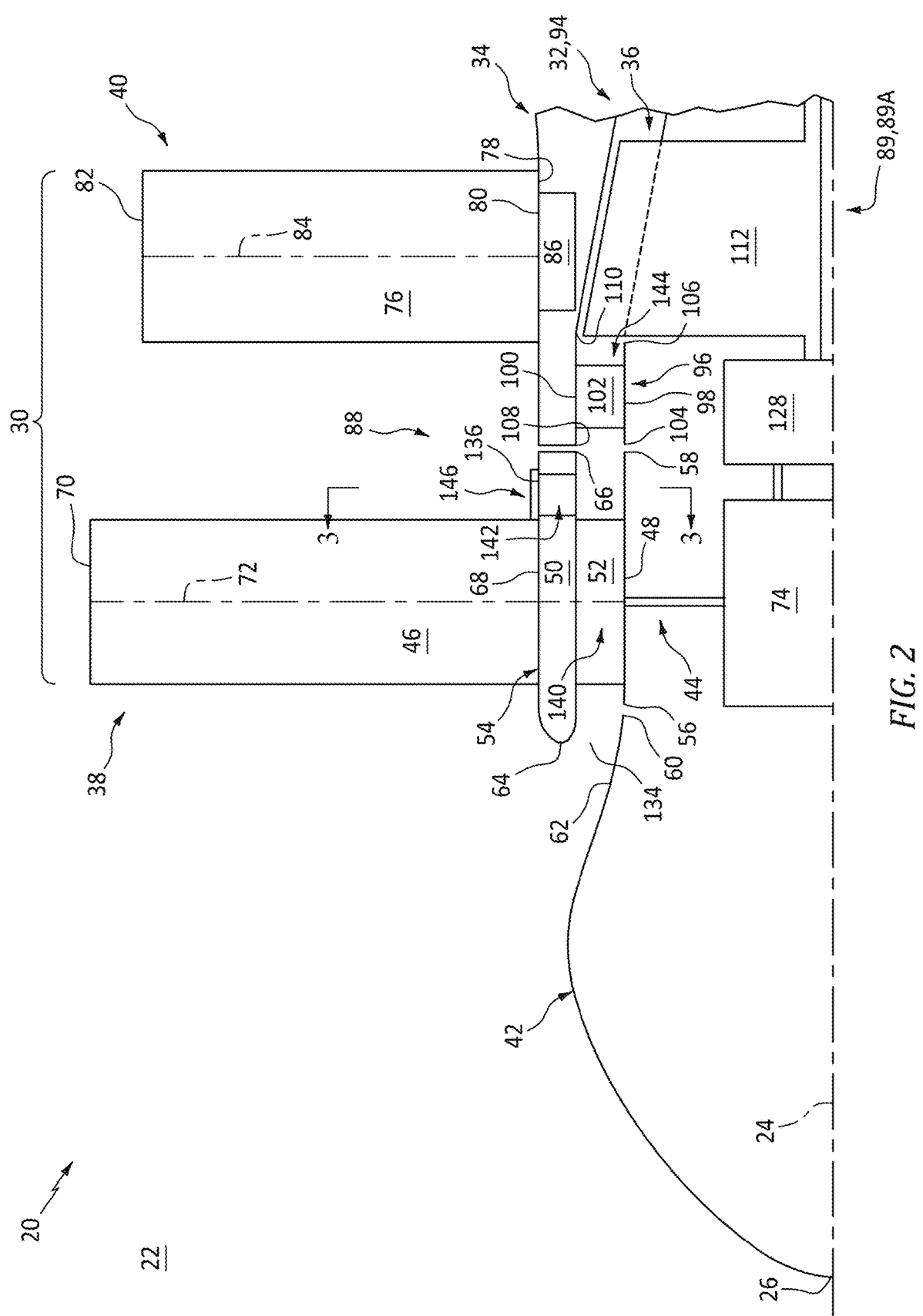
FIG. 2 is a schematic sectional illustration of a portion of the aircraft propulsion system at a propulsion section.

Referring to FIG. 2, the propulsion section 30 includes an open propulsor rotor 38 and an open guide vane structure 40. These propulsion section members 38 and 40 are un-ducted components of the aircraft propulsion system 20 and its propulsion section 30. The propulsion section 30 of FIG. 2 also includes a nose cone 42 disposed at (e.g., on, adjacent or proximate) the propulsion system forward end 26. Briefly, this nose cone 42 may be configured as a spinner which is rotatable with the propulsor rotor 38 about the propulsion system axis 24. Alternatively, it is contemplated the nose cone 42 may be configured as a stationary structure of the propulsion section 30.

The propulsor rotor 38 includes a rotor base 44 and a plurality of open propulsor blades 46; e.g., airfoils. The rotor base 44 of FIG. 2 includes a propulsor inner wall 48, a propulsor outer wall 50 and a plurality of inlet vanes 52. This rotor base 44 and its members 48, 50 and 52 are configured to form a rotating inlet duct 54 for the engine flowpath 36 axially across the propulsor rotor 38.

The propulsor inner wall 48 extends axially along the propulsion system axis 24 from an upstream, forward end 56 of the propulsor inner wall 48 to a downstream, aft end 58 of the propulsor inner wall 48. The propulsor inner wall forward end 56 of FIG. 2 is axially adjacent a downstream, aft end 60 of an exterior wall 62 of the nose cone 42 at an intersection between the propulsor inner wall 48 and the exterior wall 62. At this intersection, the propulsor inner wall 48 of FIG. 2 is flush with the exterior wall 62. The propulsor inner wall 48 extends circumferentially around the propulsion system axis 24, providing the propulsor inner wall 48 of FIG. 2 with a full-hoop (e.g., tubular) geometry. The propulsor inner wall 48 forms a radial inner peripheral boundary of the engine flowpath 36 through the propulsor rotor 38 and its rotating inlet duct 54.

The propulsor outer wall 50 extends axially along the propulsion system axis 24 from an upstream, forward end 64 of the propulsor outer wall 50 to a downstream, aft end 66 of the propulsor outer wall 50. The propulsor outer wall forward end 64 of FIG. 2 is axially offset forward of the propulsor inner wall forward end 56 such that the propulsor outer wall 50 axially overlaps a portion of the exterior wall 62. However, it is contemplated the propulsor outer wall forward end 64 may alternatively be axially aligned with the propulsor inner wall forward end 56 or axially offset aft of the propulsor inner wall forward end 56. The propulsor outer wall 50 of FIG. 2 is spaced radially outward from the propulsor inner wall 48 as well as the axially overlapped portion of the exterior wall 62. The propulsor outer wall 50 extends circumferentially around the propulsion system axis 24, providing the propulsor outer wall 50 of FIG. 2 with a full-hoop (e.g., tubular) geometry circumscribing the propulsor inner wall 48 as well as the axially overlapped portion of the exterior wall 62. The propulsor outer wall 50 forms a radial outer peripheral boundary of the engine flowpath 36 through the propulsor rotor 38 and its rotating inlet duct 54.

The inlet vanes 52 are arranged and may be equispaced circumferentially about the propulsion system axis 24 in an array; e.g., a circular array. Each of the inlet vanes 52 projects radially across the engine flowpath 36 from the propulsor inner wall 48 to the propulsor outer wall 50. Each of the inlet vanes 52 may also be connected to the propulsor inner wall 48 and the propulsor outer wall 50. Each of the inlet vanes 52, for example, may be formed integral with or fixedly attached to the propulsor inner wall 48 and the propulsor outer wall 50. In such an example, the inlet vanes 52 may be configured as aerodynamic struts or fixed pitch compressor blades. In another example, each of the inlet vanes 52 may be coupled to and pivotable with a respective one of the propulsor blades 46. In such an example, the inlet vanes 52 may be configured as pivotable adjustable pitch compressor blades. However, for ease of description, the inlet vanes 52 are generally described below as struts that are fixed to the propulsor inner wall 48 and the propulsor outer wall 50.

The propulsor blades 46 are arranged and may be equispaced circumferentially about the rotor base 44 and the propulsion system axis 24 in an array; e.g., a circular array. This array of the propulsor blades 46 may be unshrouded or alternatively shrouded by a tubular propulsor rotor shroud dedicated to the propulsor rotor 38 for example. Each of the propulsor blades 46 is connected to the rotor base 44 and rotatable with the rotor base 44 about the propulsion system axis 24. Each of the propulsor blades 46 projects spanwise along a span line of the respective propulsor blade 46 (e.g., radially relative to the propulsion system axis 24) out from an exterior surface 68 of the rotor base 44 and its propulsor outer wall 50, into the external environment 22, to a distal tip 70 of the respective propulsor blade 46. The exterior surface 68 radially borders the external environment 22 and forms a platform surface of the propulsor rotor 38. Each propulsor blade 46 is thereby configured as an un-ducted propulsor blade which is exposed to (e.g., disposed in) the surrounding external environment 22.

Each propulsor blade 46 may be configured to pivot about a respective blade pivot axis 72. This blade pivot axis 72 extends radially relative to the propulsion system axis 24. The blade pivot axis 72 of FIG. 2, for example, is arranged perpendicular to the propulsion system axis 24 when viewed, for example, in a longitudinal reference plane parallel to (e.g., including) the propulsion system axis 24; e.g., the plane of FIG. 2. Each propulsor blade 46 of FIG. 2 is operatively coupled with a propulsor actuation system 74. This propulsor actuation system 74 is configured to pivot each propulsor blade 46 about its respective blade pivot axis 72. By pivoting each propulsor blade 46 about its blade pivot axis 72, a pitch of the respective propulsor blade 46 may be changed. Note, while the blade pivot axis 72 is shown in FIG. 2 as being perpendicular to the propulsion system axis 24, it is contemplated this blade pivot axis 72 may or may not be coincident with the propulsion system axis 24. Moreover, it is contemplated each blade pivot axis 72 may alternatively be angularly offset from the propulsion system axis 24 by an acute angle or an obtuse angle when viewed, for example, in the longitudinal reference plane.

The guide vane structure 40 of FIG. 2 includes a plurality of open exit guide vanes 76 (e.g., airfoils) that are arranged and may be equispaced circumferentially about the propulsion system axis 24 and the housing structure 34 in an array; e.g., a circular array. This array of the guide vanes 76 may be unshrouded or alternatively shrouded by a tubular guide vane shroud dedicated to the guide vane structure 40 for example. The guide vane structure 40 and its guide vanes 76 are arranged axially next to (e.g., neighboring) the propulsor rotor 38 and its propulsor blades 46. The guide vane structure 40 and its guide vanes 76 of FIG. 2, for example, are arranged downstream of the propulsor rotor 38 and its propulsor blades 46, without (e.g., any) other elements axially therebetween to obstruct, turn and/or otherwise influence the air propelled by the propulsor rotor 38 to the guide vane structure 40 for example. Each of the guide vanes 76 of FIG. 2 is coupled to a support structure 78 (see also FIG. 1) of the housing structure 34. This support structure 78 may be configured as or otherwise include a support frame, a case and/or another fixed structure of the housing structure 34. Each of the guide vanes 76 projects spanwise along a span line of the respective guide vane 76 (e.g., radially relative to the propulsion system axis 24) out from an exterior surface 80 of the housing structure 34, into the external environment 22, to a distal tip 82 of the respective guide vane 76. Here, the exterior surface 80 radially borders the external environment 22 and forms an exterior aerodynamic flow surface of the aircraft propulsion system 20. Each guide vane 76 is thereby configured as an un-ducted guide vane which is exposed to (e.g., disposed in) the surrounding external environment 22.

Each of the guide vanes 76 may be configured to pivot about a respective vane pivot axis 84. This vane pivot axis 84 extends radially relative to the propulsion system axis 24. The vane pivot axis 84 of FIG. 2, for example, is arranged perpendicular to the propulsion system axis 24 when viewed, for example, in the longitudinal reference plane. Each of the guide vanes 76 of FIG. 2 is operatively coupled with a vane actuation system 86. This vane actuation system 86 may be discrete from or integrated as part of the propulsor actuation system 74. The vane actuation system 86 is configured to pivot each of the guide vanes 76 about its own respective vane pivot axis 84. By pivoting each of the guide vanes 76 about its vane pivot axis 84, a pitch of the respective guide vane 76 may be changed. Note, while the vane pivot axis 84 is shown in FIG. 2 as being perpendicular to the propulsion system axis 24, it is contemplated this vane pivot axis 84 may or may not be coincident with the propulsion system axis 24. Moreover, it is contemplated each vane pivot axis 84 may alternatively be angularly offset from the propulsion system axis 24 by an acute angle or an obtuse angle when viewed, for example, in the longitudinal reference plane. Of course, it is contemplated some or all of the guide vanes 76 may be alternatively moved to change the guide vane pitch and/or another guide vane parameter such as vane camber. Moreover, it is contemplated some or all of the guide vanes 76 may alternatively be fixed position guide vanes in other embodiments.

Referring to FIG. 1, the aircraft propulsion system 20 and its turbine engine 32 include an inlet section 88, a compressor section 89, a combustor section 90, a turbine section 91 and an exhaust section 92. The compressor section 89 of FIG. 1 includes a low pressure compressor (LPC) section 89A and a high pressure compressor (HPC) section 89B. The turbine section 91 of FIG. 1 includes a high pressure turbine (HPT) section 91A and a low pressure turbine (LPT) section 91B. At least (or only) the LPC section 89A, the HPC section 89B, the combustor section 90, the HPT section 91A and the LPT section 91B collectively form a core 94 (e.g., a gas generator) of the turbine engine 32.

Referring to FIG. 2, the inlet section 88 includes the rotating inlet duct 54 and a downstream stationary inlet duct 96. The stationary inlet duct 96 may be configured as part of or otherwise fixed to the housing structure 34. The stationary inlet duct 96 of FIG. 2 includes a duct inner wall 98, a duct outer wall 100 and a plurality of duct vanes 102.

The duct inner wall 98 extends axially along the propulsion system axis 24 from an upstream, forward end 104 of the duct inner wall 98 to a downstream, aft end 106 of the duct inner wall 98. The duct inner wall forward end 104 of FIG. 2 is axially adjacent the propulsor inner wall aft end 58 at an intersection between the duct inner wall 98 and the propulsor inner wall 48. At this intersection, the duct inner wall 98 of FIG. 2 is flush with the propulsor inner wall 48. The duct inner wall 98 extends circumferentially around the propulsion system axis 24, providing the duct inner wall 98 of FIG. 2 with a full-hoop (e.g., tubular) geometry. The duct inner wall 98 forms a radial inner peripheral boundary of the engine flowpath 36 through the stationary inlet duct 96, for example, from the rotating inlet duct 54 to the compressor section 89.

The duct outer wall 100 extends axially along the propulsion system axis 24 from an upstream, forward end 108 of the duct outer wall 100 to a downstream, aft end 110 of the duct outer wall 100. The duct outer wall forward end 108 of FIG. 2 is axially adjacent the propulsor outer wall aft end 66 at an intersection between the duct outer wall 100 and the propulsor outer wall 50. At this intersection, the duct outer wall 100 of FIG. 2 is flush with the propulsor outer wall 50. The duct outer wall 100 of FIG. 2 is spaced radially outward from the duct inner wall 98. The duct outer wall 100 extends circumferentially around the propulsion system axis 24, providing the duct outer wall 100 of FIG. 2 with a full-hoop (e.g., tubular) geometry circumscribing the duct inner wall 98. The duct outer wall 100 forms a radial outer peripheral boundary of the engine flowpath 36 through the stationary inlet duct 96, for example, from the rotating inlet duct 54 to the compressor section 89.

The duct vanes 102 are arranged and may be equispaced circumferentially about the propulsion system axis 24 in an array; e.g., a circular array. Each of the duct vanes 102 projects radially across the engine flowpath 36 from the duct inner wall 98 to the duct outer wall 100. Each of the duct vanes 102 may also be connected to the duct inner wall 98 and the duct outer wall 100. Each of the duct vanes 102, for example, may be formed integral with or fixedly attached to the duct inner wall 98 and the duct outer wall 100. The present disclosure, however, is not limited to such a fixed duct vane arrangement. In other embodiments, for example, it is contemplated one or more of the duct vanes 102 may each be pivotable and/or otherwise adjustable to change its pitch.

Referring to FIG. 1, the LPC section 89A includes a bladed low pressure compressor (LPC) rotor 112. The HPC section 89B includes a bladed high pressure compressor (HPC) rotor 113. The HPT section 91A includes a bladed high pressure turbine (HPT) rotor 114. The LPT section 91B includes a bladed low pressure turbine (LPT) rotor 115. Each of these engine rotors 112-115 includes a rotor base (e.g., a disk or a hub) and a plurality of rotor blades (e.g., airfoils, vanes, etc.). The rotor blades may also be arranged into one or more stages longitudinally along the engine flowpath 36. Within each stage, the rotor blades are arranged and may be equispaced circumferentially around the respective rotor base in an array; e.g., a circular array. Each of the rotor blades is connected to the respective rotor base. Each of the rotor blades projects radially (e.g., spanwise) out from the respective rotor base into the engine flowpath 36 and to a distal tip of the respective rotor blade.

The HPC rotor 113 is coupled to and rotatable with the HPT rotor 114. The HPC rotor 113 of FIG. 1, for example, is connected to the HPT rotor 114 by a high speed shaft 118. At least (or only) the HPC rotor 113, the HPT rotor 114 and the high speed shaft 118 collectively form a high speed rotating structure 120; e.g., a high speed spool of the turbine engine 32 and its engine core 94. This high speed rotating structure 120 of FIG. 1 and its members 113, 114 and 118 are rotatable about the propulsion system axis 24. However, in other embodiments, the high speed rotating structure 120 may alternatively be rotatable about another rotational axis which is (e.g., laterally and/or angularly) offset from the rotational axis of the propulsor rotor 38.

The LPC rotor 112 is coupled to and rotatable with the LPT rotor 115. The LPC rotor 112 of FIG. 1, for example, is connected to the LPT rotor 115 by a low speed shaft 122. At least (or only) the LPC rotor 112, the LPT rotor 115 and the low speed shaft 122 collectively form a low speed rotating structure 124; e.g., a low speed spool of the turbine engine 32 and its engine core 94. This low speed rotating structure 124 of FIG. 1 and its members 112, 115 and 122 are rotatable about the propulsion system axis 24. However, in other embodiments, the low speed rotating structure 124 may alternatively be rotatable about another rotational axis which is (e.g., laterally and/or angularly) offset from the rotational axis of the propulsor rotor 38.

The low speed rotating structure 124 is coupled to the propulsor rotor 38 and its rotor base 44 through a drivetrain 126. This drivetrain 126 may be configured as a geared drivetrain, where a geartrain 128 (e.g., a transmission, a speed change device, an epicyclic geartrain, etc.) is disposed between and operatively couples the propulsor rotor 38 to the low speed rotating structure 124 and its LPT rotor 115. With this arrangement, the propulsor rotor 38 may rotate at a different (e.g., slower) rotational speed than the low speed rotating structure 124 and its LPT rotor 115. Here, the propulsor rotor 38 and the low speed rotating structure 124 may rotate in a common (the same) direction about the propulsion system axis 24 or in opposite directions about the propulsion system axis 24 depending, for example, upon the specific configuration of the geartrain 128. Alternatively, the drivetrain 126 may be configured as a direct-drive drivetrain, where the geartrain 128 is omitted. With such an arrangement, the propulsor rotor 38 rotates at a common (the same) rotational speed as the low speed rotating structure 124 and its LPT rotor 115.

The inlet section 88, the LPC section 89A, the HPC section 89B, the combustor section 90, the HPT section 91A, the LPT section 91B and the exhaust section 92 may be arranged sequentially along the propulsion system axis 24. These engine sections 88-92 are housed within and/or formed by the housing structure 34. The housing structure 34 of FIG. 1, for example, includes the support structure 78, the stationary inlet duct 96, an engine case 130 (e.g., a gas generator case) and a propulsion system nacelle 132. The engine case 130 houses one or more of the engine sections 89A-91B; e.g., the engine core 94. The engine case 130 of FIG. 1, for example, extends axially along (e.g., axially overlaps) and extends circumferentially about (e.g., circumscribes) the engine sections 89A-91B and the respective engine rotors 112-115. The stationary inlet duct 96 may also house at least a portion of the drivetrain 126 and its geartrain 128. Here, the duct inner wall 98 may be attached to or formed as an integral part of the engine case 130. The propulsion system nacelle 132 houses and provides an aerodynamic cover over the engine case 130. An exterior wall of the propulsion system nacelle 132 of FIG. 1, for example, is disposed radially outboard of, extends axially along (e.g., axially overlaps) and extends circumferentially about (e.g., circumscribes) the engine core 94 and its engine case 130. This nacelle wall may form the exterior surface 80 downstream and aft of the support structure 78. With the foregoing arrangement, the engine rotors 112-115 are disposed within the housing structure 34. By contrast, the propulsor rotor 38 and the guide vane structure 40 are disposed at least partially (or completely) outside of the housing structure 34 within the external environment 22.

The engine flowpath 36 extends longitudinally through the engine core 94 between a plurality of airflow inlets 134 and 136 into the engine flowpath 36 to a combustion products exhaust 138 from the engine flowpath 36. The engine flowpath 36 of FIG. 2, for example, includes an upstream end inlet leg 140, one or more downstream side inlet legs 142 and a core leg 144.

The upstream end inlet leg 140 projects axially along the propulsion system axis 24 into the aircraft propulsion system 20 and its propulsor rotor 38 to an inter-leg intersection with the downstream side inlet legs 142 and the core leg 144. The upstream end inlet leg 140 of FIG. 2, for example, projects longitudinally from the upstream end flowpath inlet 134 into the propulsor rotor 38 and its rotating inlet duct 54 to the inter-leg intersection. With this arrangement, the upstream end flowpath inlet 134 is located upstream and axially forward of the propulsor blades 46. The upstream end inlet leg 140 and its upstream end flowpath inlet 134 are also located radially inboard of the array of the propulsor blades 46 and the propulsor outer wall 50. Here, the upstream end flowpath inlet 134 extends circumferentially around the propulsion system axis 24, providing the upstream end flowpath inlet 134 with a full-hoop (e.g., annular) geometry.

Figure 3:
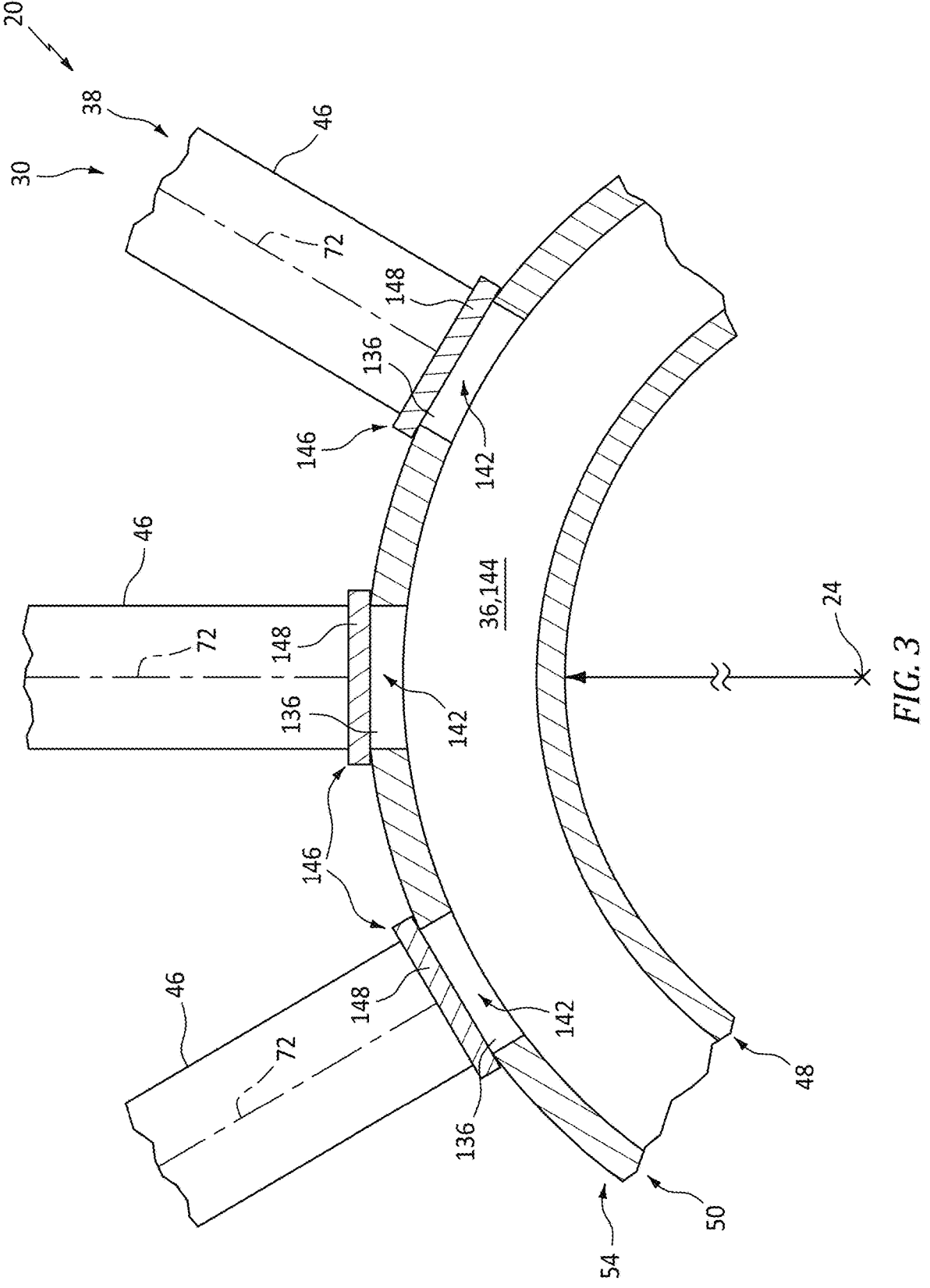
FIG. 3 is a schematic cross-sectional illustration of a portion of an open propulsor rotor configured with closed flowpath inlets taken along line 3-3 in FIG. 2.

Referring to FIG. 3, the downstream side inlet legs 142 are arranged and may (or may not) be equispaced circumferentially about the propulsion system axis 24 in an array;

e.g., a circular array. For ease of description, each downstream side inlet leg 142 and its respective downstream side flowpath inlet 136 is associated with (e.g., circumferentially aligned with) a respective one (or every other one, etc.) of the propulsor blades 46. The present disclosure, however, is not limited to a one-to-one or other whole number ratio between the flowpath members 136, 142 and the propulsor blades 46. Referring to FIGS. 2 and 3, each downstream side inlet leg 142 projects radially inward towards the propulsion system axis 24 into the aircraft propulsion system 20 and its propulsor rotor 38 from the respective downstream side flowpath inlet 136 to the inter-leg intersection. Each downstream side inlet leg 142 of FIG. 2, for example, projects through the propulsor outer wall 50 from its respective downstream side flowpath inlet 136 to the inter-leg intersection. With this arrangement, the downstream side flowpath inlets 136 are disposed to a radial outer side of the engine flowpath 36. Here, the downstream side inlet legs 142 and their downstream side flowpath inlets 136 are located downstream and axially aft of the propulsor blades 46. The downstream side inlet legs 142 and their downstream side flowpath inlets 136 are also located upstream and axially forward of the guide vane structure 40 and its guide vanes 76. Referring to FIG. 3, each downstream side flowpath inlet 136 may extend laterally (e.g., circumferentially or tangentially) within the propulsor outer wall 50 between opposing lateral sides of the respective downstream side flowpath inlet 136. Each downstream side flowpath inlet 136 may thereby have a non-annular geometry. More particularly, each downstream side flowpath inlet 136 may be configured as a discrete port or window into the propulsor outer wall 50.

Figure 4C:
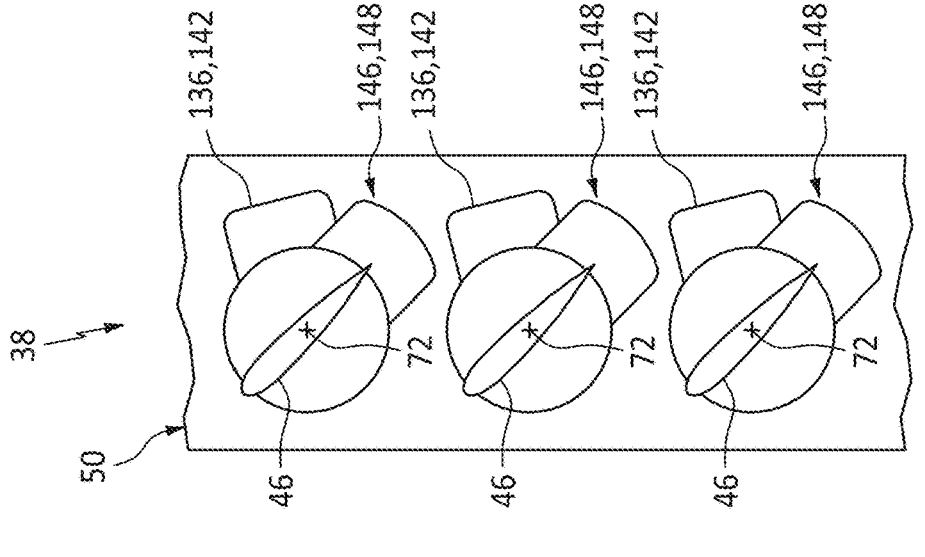
FIGS. 4A-C are plan view illustrations of a portion of the open propulsor rotor configured with flowpath regulators in various arrangements.
Figure 4B:
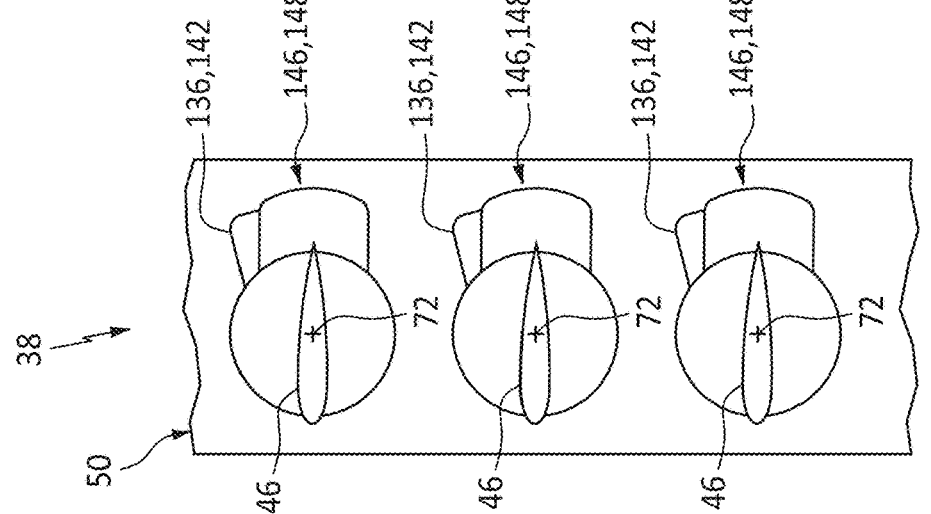
Figure 4A:

Referring to FIGS. 4A-C, one, some or all of the downstream side inlet legs 142 and their downstream side flowpath inlets 136 (see FIGS. 4B and 4C) may be arranged with a (e.g., dedicated) flow regulator 146. Each flow regulator 146 is configured to selectively regulate a flow of air entering the engine flowpath 36 and its respective downstream side inlet leg 142 from the external environment 22 through the respective downstream side flowpath inlet 136. Each flow regulator 146 of FIGS. 4A-C, for example, includes a regulator door 148; e.g., a cover, a deflector, etc. Each regulator door 148 of FIGS. 4A-C is configured to pivot about the blade pivot axis 72 of the propulsor blade 46 with which that flow regulator 146 and its regulator door 148 is aligned. More particularly, each regulator door 148 is configured to pivot about the blade pivot axis 72 (here, also a door pivot axis) between a closed position (e.g., see FIG. 4A) and an open position (e.g., see FIG. 4C). When a respective regulator door 148 is in its closed position of FIG. 4A, that regulator door 148 of FIG. 3 substantially or completely covers the respective downstream side flowpath inlet 136. The respective regulator door 148 may thereby fluidly decouple the respective downstream side flowpath inlet 136 from the external environment 22. No air may therefore flow from the external environment 22 into the respective downstream side inlet leg 142 of the engine flowpath 36 through its downstream side flowpath inlet 136. By contrast, when the respective regulator door 148 is in its open position of FIG. 4C, that regulator door 148 uncovers the respective downstream side flowpath inlet 136. Air may thereby flow from the external environment 22 into the respective downstream side inlet leg 142 of the engine flowpath 36 through its downstream side flowpath inlet 136 substantially unobstructed. Of course, it is contemplated the respective regulator door 148 may also pivot to an intermediate position (e.g., see FIG. 4B) to provide a metered flow of the air from the external environment 22 into the respective downstream side inlet leg 142 of the engine flowpath 36 through its downstream side flowpath inlet 136.

Figure 5B:
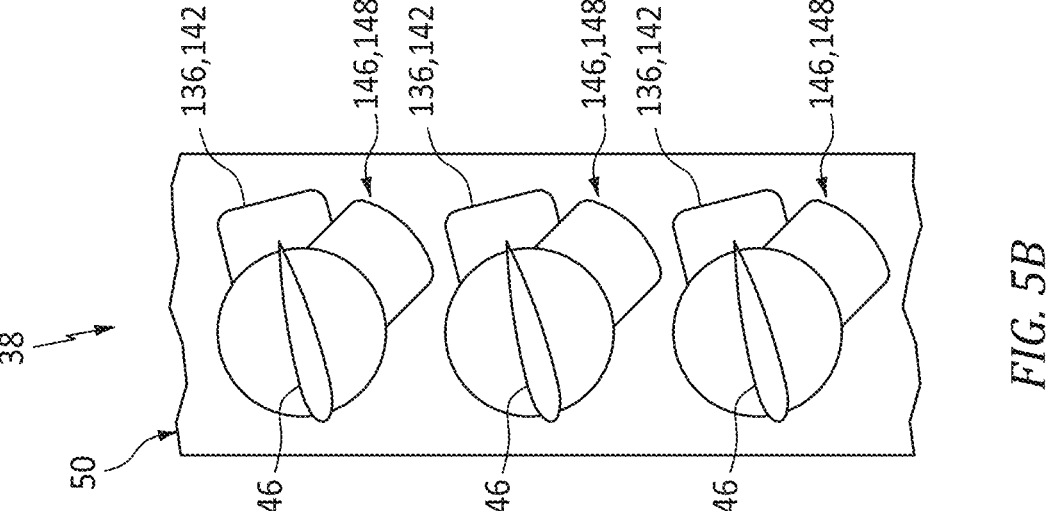
FIGS. 5A and 5B are plan view illustrations of a portion of the open propulsor rotor configured with alternate flowpath regulators in various arrangements.
Figure 5A:
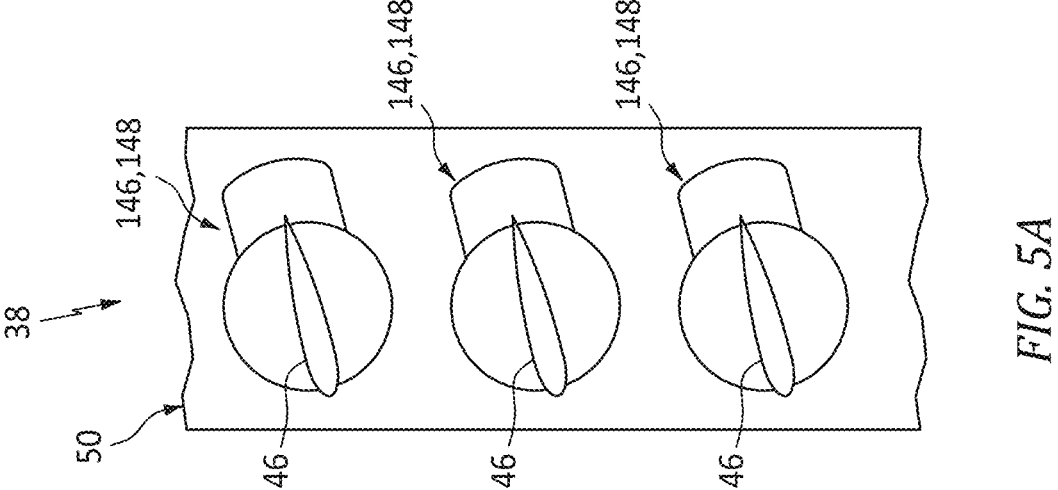

Each regulator door 148 of FIGS. 4A-C may be operatively coupled to the propulsor blade 46 with which that flow regulator 146 and its regulator door 148 is aligned. Each regulator door 148 of FIGS. 4A-C, for example, is formed integral with or otherwise attached to a base (e.g., a puck) of the respective propulsor blade 46. Each flow regulator 146 and its regulator door 148 may thereby be actuated by and in synchronization with the respective propulsor blade 46. The present disclosure, however, is not limited to such an exemplary arrangement. For example, referring to FIGS. 5A and 5B, each flow regulator 146 and its regulator door 148 may alternatively be operationally independent of the respective propulsor blade 46 such that that regulator door 148 may pivot independent of the respective propulsor blade 46.

Referring to FIG. 2, the core leg 144 is fluidly coupled to the upstream end inlet leg 140 and each of the downstream side inlet legs 142 in parallel at the inter-leg interface. The core leg 144 of FIG. 1 extends longitudinally from the inter-leg interface, through the engine core 94, and to the flowpath exhaust 138. More particularly, the engine flowpath 36 and its core leg 144 extends longitudinally through the stationary inlet duct 96, the LPC section 89A, the HPC section 89B, the combustor section 90, the HPT section 91A, the LPT section 91B and the exhaust section 92 to the flowpath exhaust 138.

The aircraft propulsion system 20 may operate in various modes of operation. These operating modes includes at least one forward thrust mode and at least one reverse thrust mode.

Figure 6A:
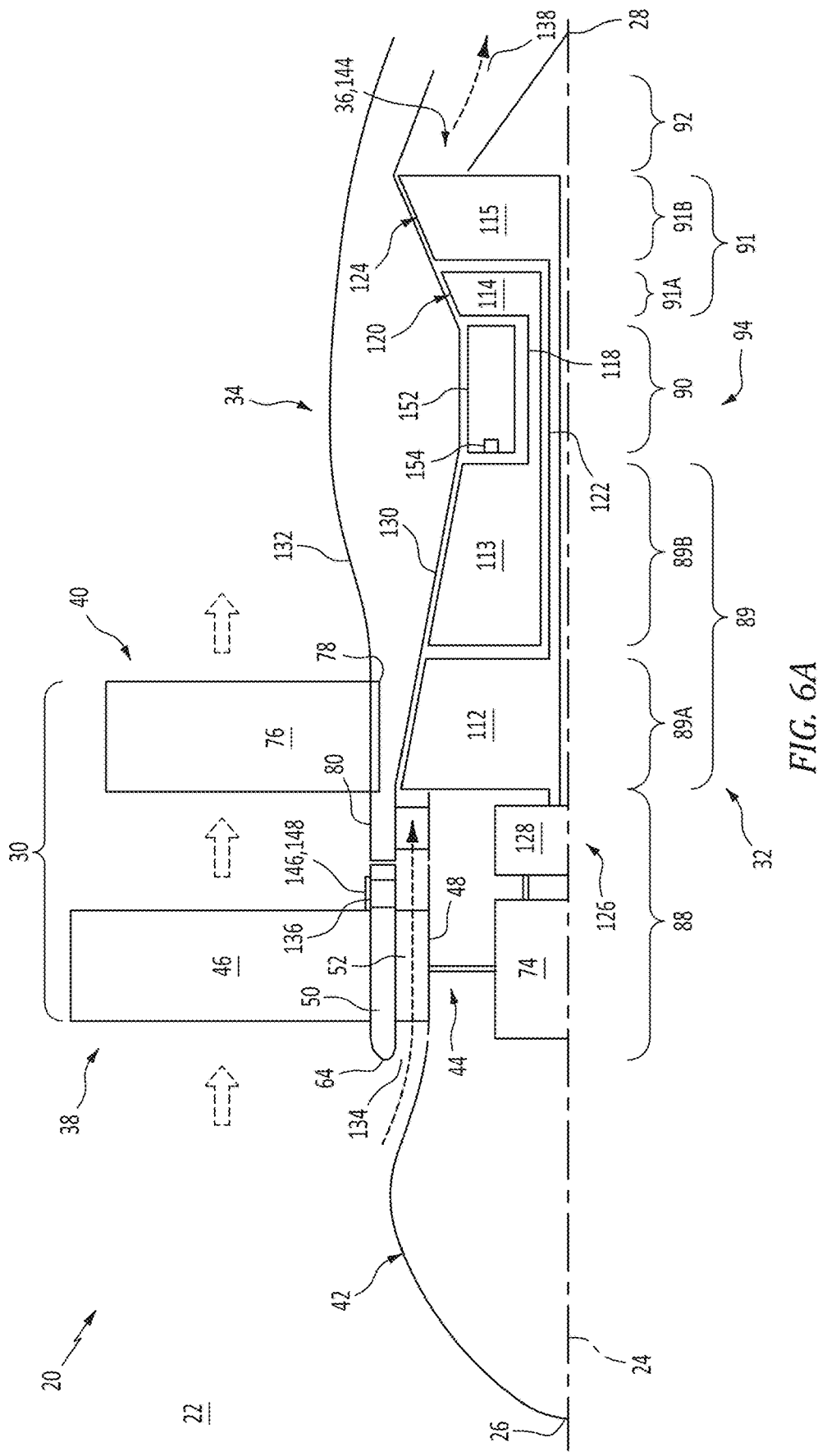
FIGS. 6A-C are partial schematic illustrations of the aircraft propulsion system during various modes of operation.

Referring to FIG. 6A, during the forward thrust mode, the aircraft propulsion system 20 and its propulsor rotor 38 are configured to provide forward aircraft thrust. For example, the propulsor blades 46 are pitched (see FIG. 4A) to propel air within the external environment 22 in an aft direction towards the propulsion system aft end 28. During the forward thrust mode, at least one, some or all of the downstream side flowpath inlets 136 may be closed (e.g., covered) by their respective flow regulators 146 and regulator doors 148. With this arrangement, the air from the external environment 22 is directed into the aircraft propulsion system 20 and its engine flowpath 36 (e.g., only) through the upstream end flowpath inlet 134. The air directed into the turbine engine 32 may be referred to as "core air". This core air is compressed by the LPC rotor 112 and the HPC rotor 113 and directed into a combustion chamber 150 (e.g., an annular combustion chamber) (see FIG. 1) of a combustor 152 (e.g., an annular combustor) in the combustor section 90. Fuel is injected into the combustion chamber 150 by one or more fuel injectors 154 and mixed with the compressed core air to provide a fuel-air mixture. This fuel-air mixture is ignited and combustion products thereof flow through and sequentially drive rotation of the HPT rotor 114 and the LPT rotor 115. The rotation of the HPT rotor 114 and the LPT rotor 115 respectively drive rotation of the HPC rotor 113 and the LPC rotor 112 and, thus, compression of the core air. The rotation of the LPT rotor 115 also drives the rotation of the propulsor rotor 38 through the drivetrain 126 and its geartrain 128 to provide the forward aircraft thrust. The turbine engine 32 and its low speed rotating structure 124 thereby power operation of (e.g., drive rotation of) the propulsor rotor 38.

Figure 6B:
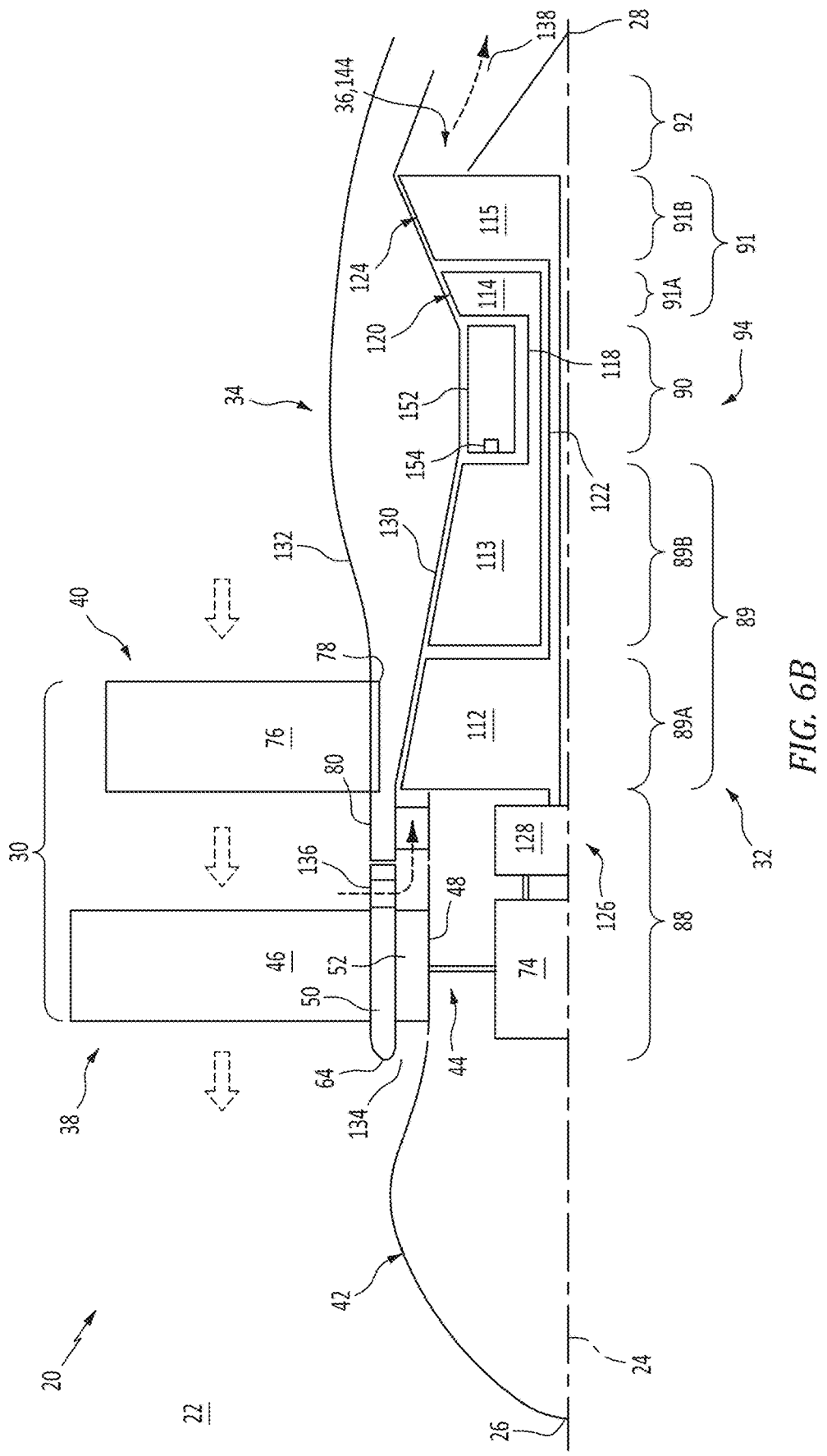

Referring to FIG. 6B, during the reverse thrust mode, the aircraft propulsion system 20 and its propulsor rotor 38 are configured to provide reverse aircraft thrust. For example, the propulsor blades 46 are pitched (see FIG. 4C) to propel the air within the external environment 22 in a forward direction towards the propulsion system forward end 26. During the reverse thrust mode of FIG. 4C, at least one, some or all of the downstream side flowpath inlets 136 may be opened (e.g., uncovered) by their respective flow regulators 146 and regulator doors 148. With this arrangement, referring to FIG. 6B, the air from the external environment 22 may be directed into the aircraft propulsion system 20 and its engine flowpath 36 through the open downstream side flowpath inlets 136. Depending on core air requirements for the turbine engine 32, the air directed into the engine flowpath 36 through these open downstream side flowpath inlets 136 may account at least a major portion (e.g., more than 50%) of the core air received by the turbine engine 32. Therefore, substantially less (if any) air must reverse direction and turn around the forward end 64 (e.g., a leading edge) of the propulsor outer wall 50 during this reverse thrust mode to supply the core air to the turbine engine 32. During the reverse thrust mode of FIG. 6B, the turbine engine 32 may operate in a similar manner as described above with respect to the forward thrust mode of FIG. 6A in order to drive the rotation of the propulsor rotor 38 and provide the reverse aircraft thrust.

Figure 6C:
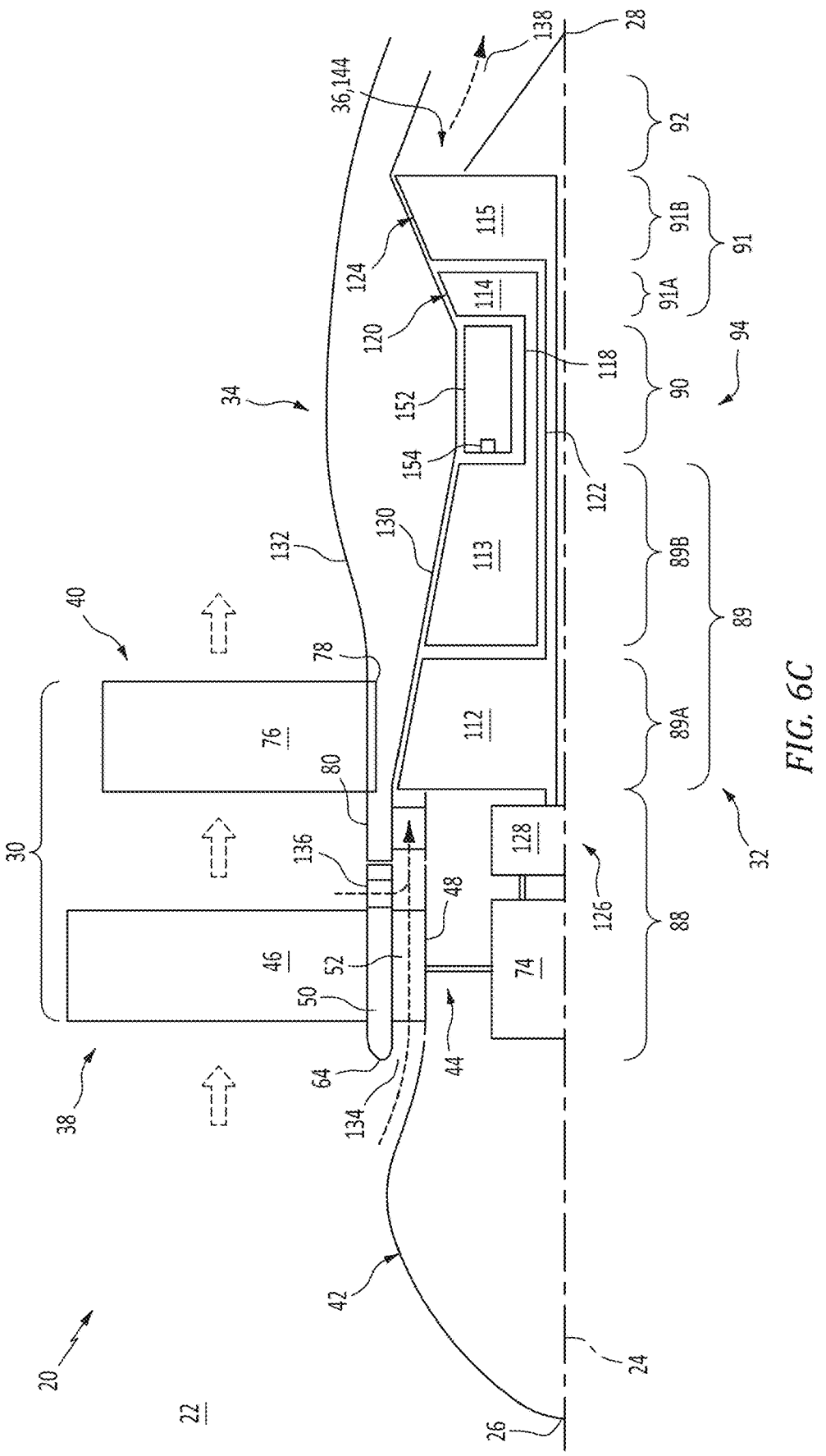

While the downstream side flowpath inlets 136 are described above as being closed during the forward thrust mode and open during the reverse thrust mode, the present disclosure is not limited thereto. For example, referring to FIG. 6C, one, some or all of the downstream side flowpath inlets 136 may be (e.g., partially) opened to increase airflow into the engine flowpath 36.

Figure 7B:
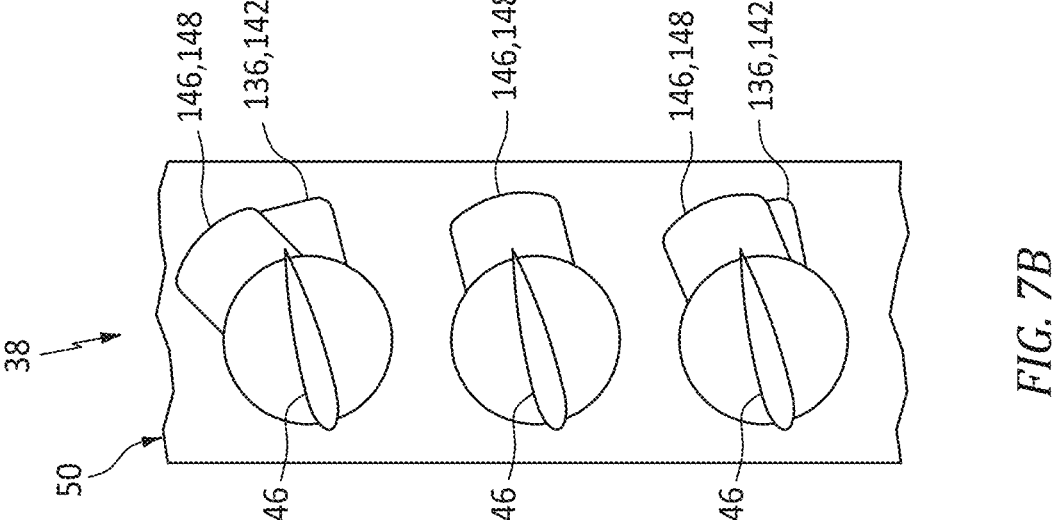
FIGS. 7A and 7B are plan view illustrations of a portion of the open propulsor rotor configured with alternate flowpath regulators.
Figure 7A:
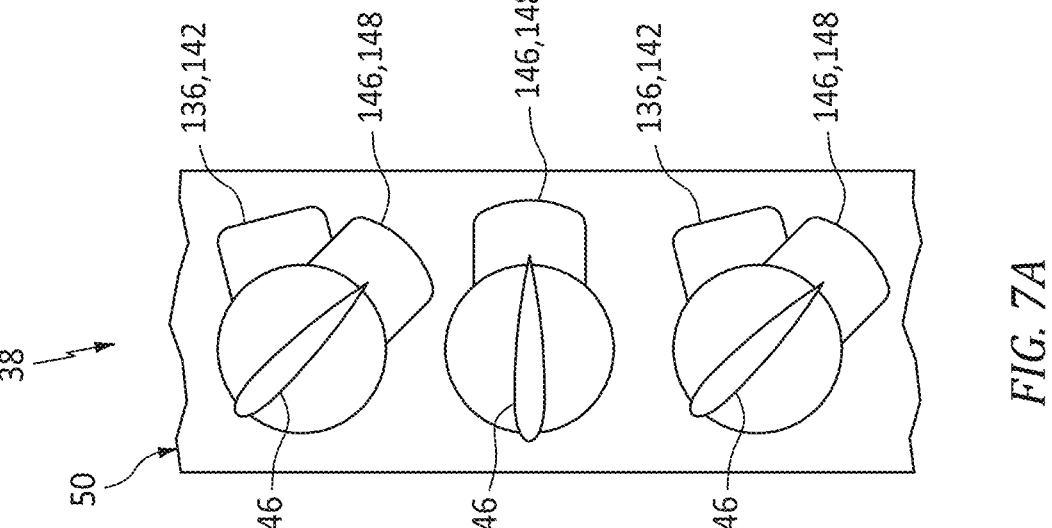

In some embodiments, referring to FIGS. 4A-C, the propulsor actuation system 74 (see FIG. 2) may pivot the regulator doors 148 to synchronously open or close the downstream side flowpath inlets 136. The regulator doors 148, for example, may be pivoted such that the downstream side flowpath inlets 136 are opened or closed simultaneously and at a common (the same) rate. In other embodiments, referring to FIGS. 7A and 7B, the propulsor actuation system 74 (see FIG. 2) may pivot the regulator doors 148 to asynchronously open or close the downstream side flowpath inlets 136. The regulator doors 148, for example, may be pivoted such that the downstream side flowpath inlets 136 are opened or closed at different times (which may or may not temporally overlap) and/or at different rates. In some embodiments, referring to FIG. 7A, the asynchronous timing may be facilitated by pivoting different sets of the regulator door(s) 148 according to different schedules. In other embodiments, referring to FIG. 7B, the asynchronous timing may be facilitated by providing different sets of the regulator door(s) 148 and/or different sets of the downstream side flowpath inlet(s) 136 with different locations, geometries, etc.

Figure 8B:
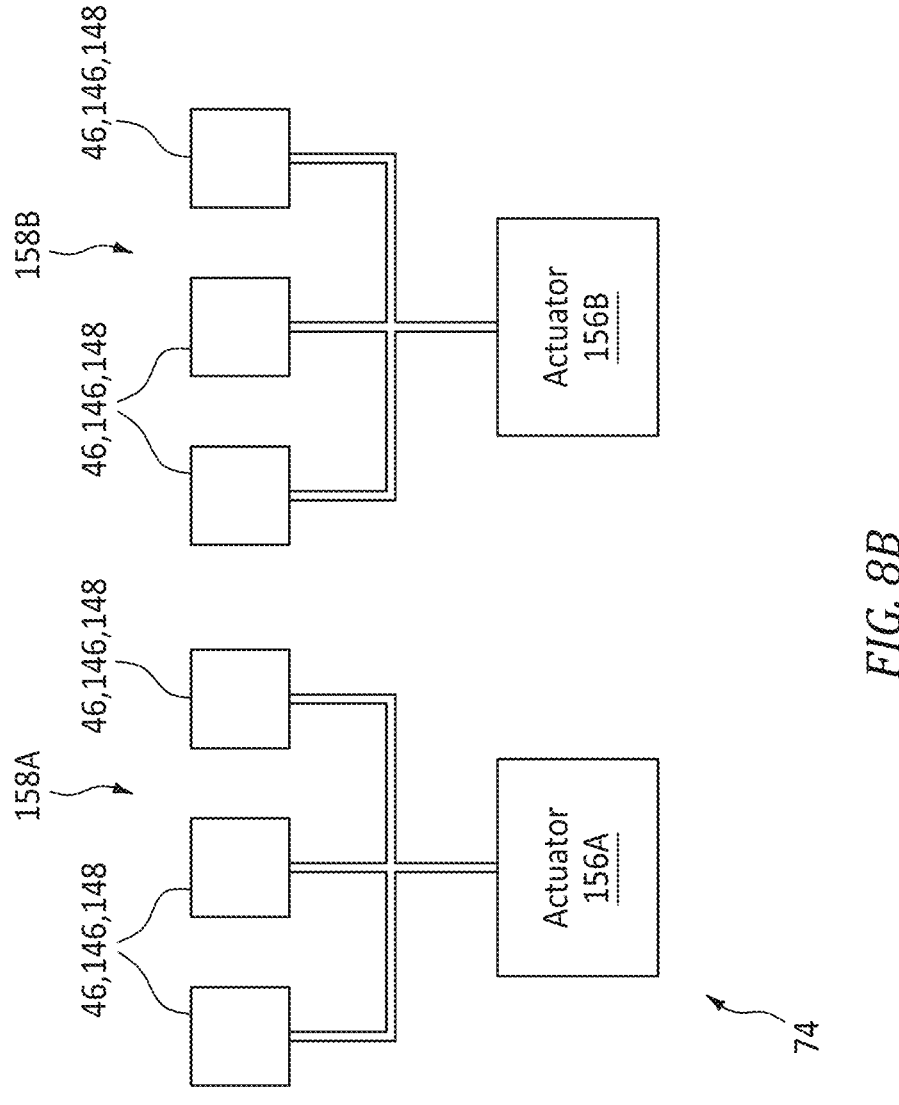
FIGS. 8A-C are partial schematic illustrations of various actuation system arrangements for propulsor blades and/or regulator doors.
Figure 8A:
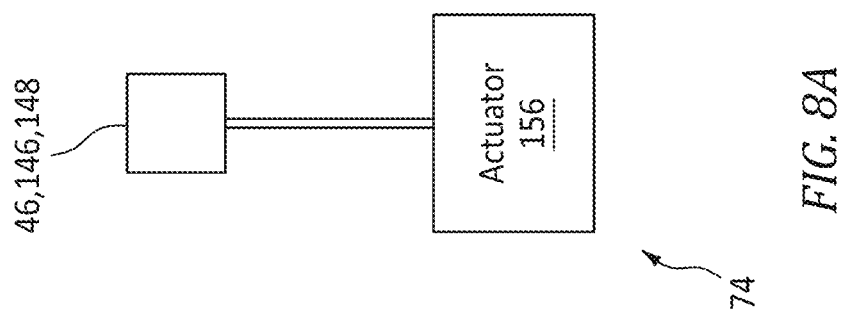
Figure 8C:
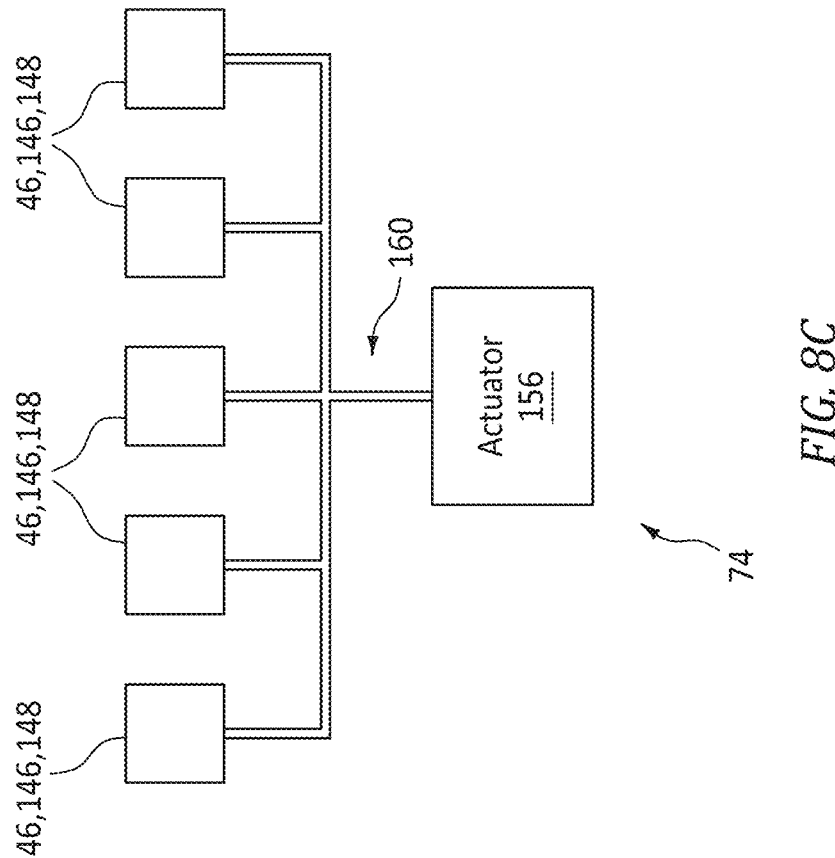
Figure 9A:
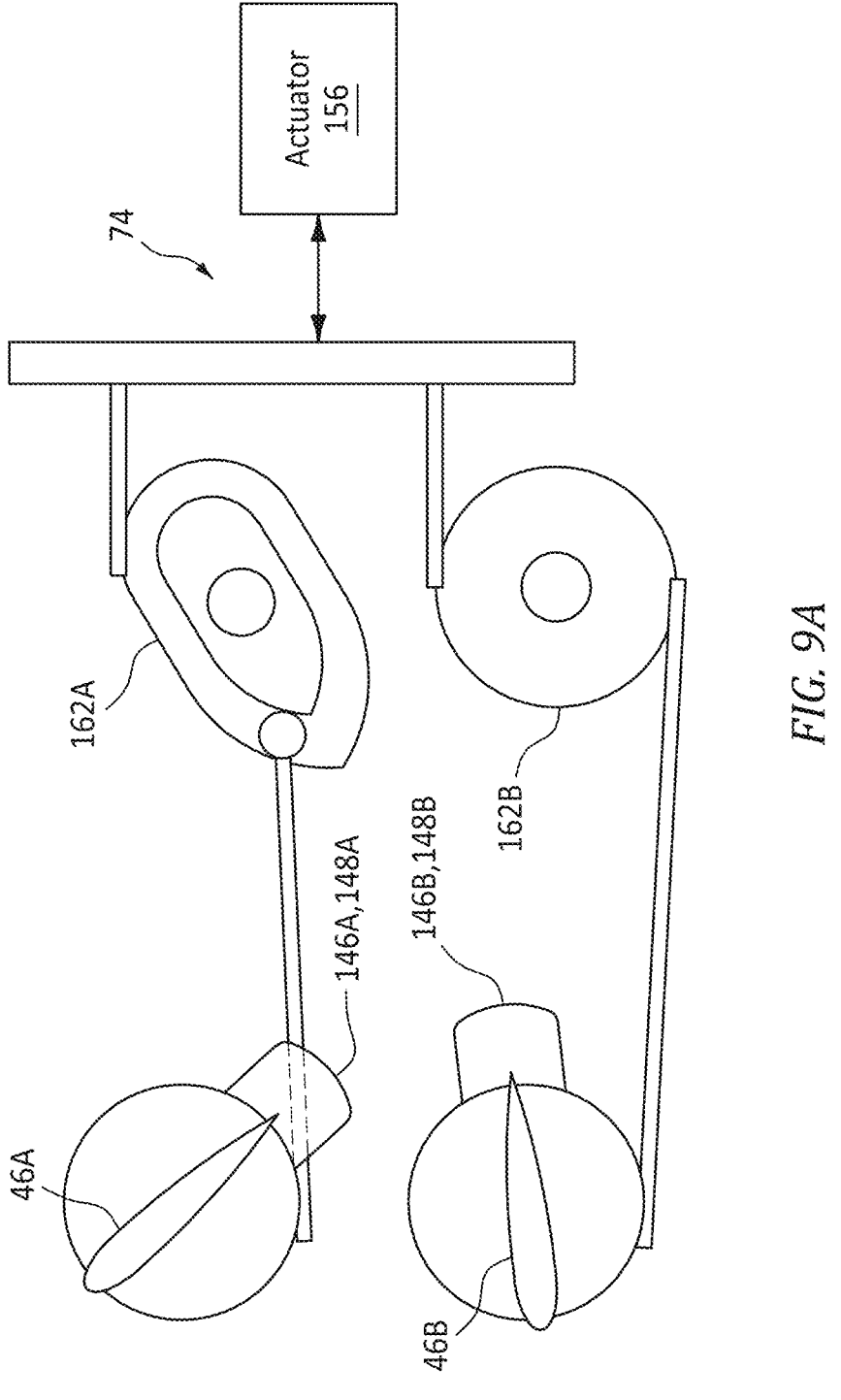
FIGS. 9A and 9B are partial schematic illustrations of various coupler arrangements between an actuator and the propulsor blades and/or the regulator doors.
Figure 9B:
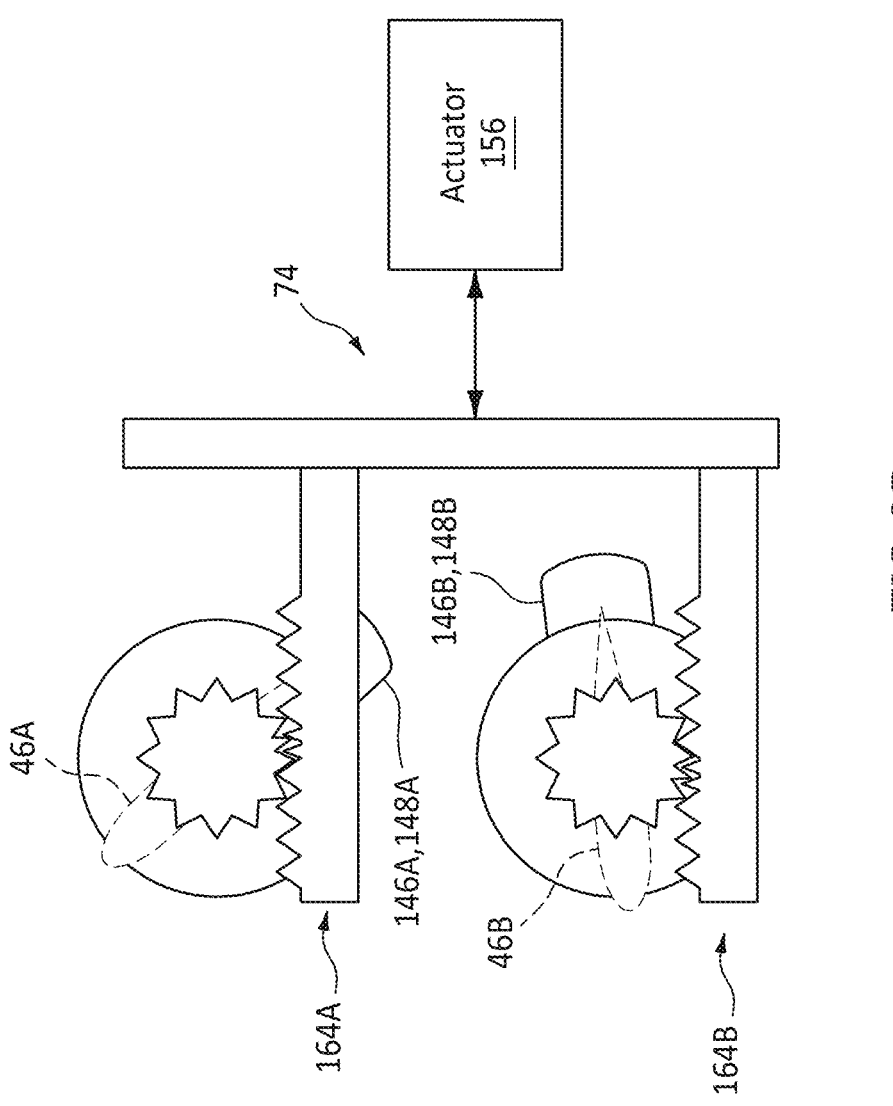

Referring to FIGS. 8A-C, the propulsor actuation system 74 may include one or more actuators 156 (e.g., electric motor(s), fluid motor(s), linear actuator(s), etc.) operatively coupled to and configured to pivot the propulsor blades 46 and/or the flow regulators 146. For example, referring to FIG. 8A, the propulsor actuation system 74 may include a dedicated actuator 156 for each propulsor blade 46 and/or each flow regulator 146. With this arrangement, each actuator 156 may be individually operated to pivot the respective propulsor blade 46 and/or the respective regulator door 148. In another example, referring to FIG. 8B, the propulsor actuation system 74 may include at least (or only) one dedicated actuator 156A, 156B (generally referred to as "156") for each respective set 158A, 158B (generally referred to as "158") of the propulsor blades 46 and/or the flow regulators 146. The first actuator 156A of FIG. 8B, for example, may be configured to collectively pivot the members 46, 148 of the first set 158A. The second actuator 156B of FIG. 8B may be configured to collectively pivot the members 46, 148 in the second set 158B. In still another example, referring to FIG. 8C, the propulsor actuation system 74 may include at least (or only) one actuator 156 for all of the propulsor blades 46 and/or the flow regulators 146. Here, a coupling 160 between the actuator 156 and each propulsor blade 46 and/or each flow regulator 146 (or set of the propulsor blades 46 and/or the flow regulators 146) may be configured to facilitate propulsor blade and/or regulator door pivoting. To facilitate different actuation schedules, the actuator 156 of FIG. 9A is coupled to a first member (e.g., 46A, 146A, 148A) through a first coupler 162A (e.g., a cam mechanism) configured to facilitate pivoting according to a first actuation schedule. The actuator 156 of FIG. 9A is coupled to a second member (e.g., 46B, 146B, 148B) through a second coupler 162B (e.g., a crank) configured to facilitate pivoting according to a second actuation schedule. In another example, the actuator 156 of FIG. 9B is coupled to the first member (e.g., 46A, 146A, 148A) through a first rack and pinion 164A configured with a first tooth pattern to facilitate pivoting according to the first actuation schedule. The actuator 156 of FIG. 9B is coupled to the second member (e.g., 46B, 146B, 148B) through a second rack and pinion 164B configured with a second tooth pattern to facilitate pivoting according to the second actuation schedule. The present disclosure, however, is not limited to the foregoing exemplary airfoil actuation system arrangements.

Figure 10A:
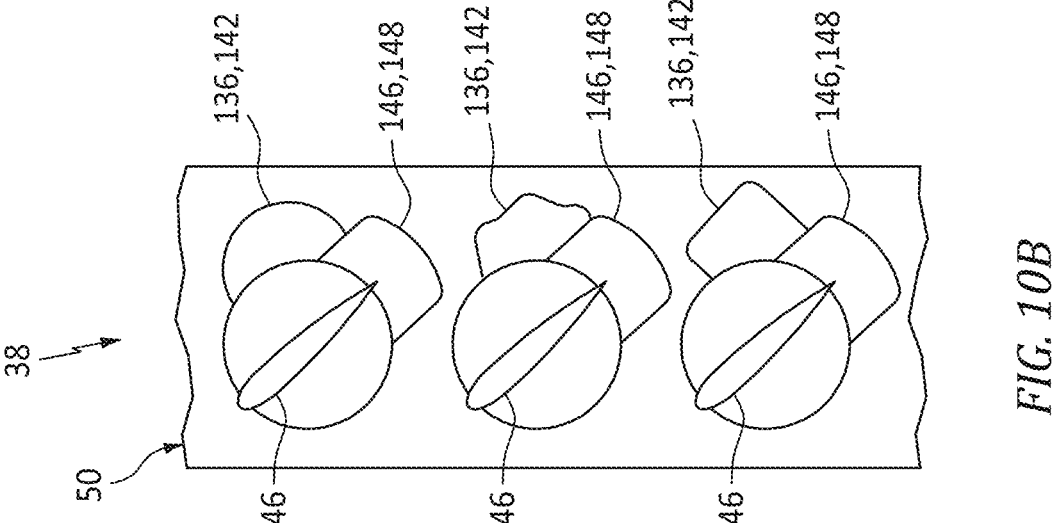
FIGS. 10A and 10B are plan view illustrations of a portion of the open propulsor rotor configured with alternate flowpath regulators.
Figure 10B:
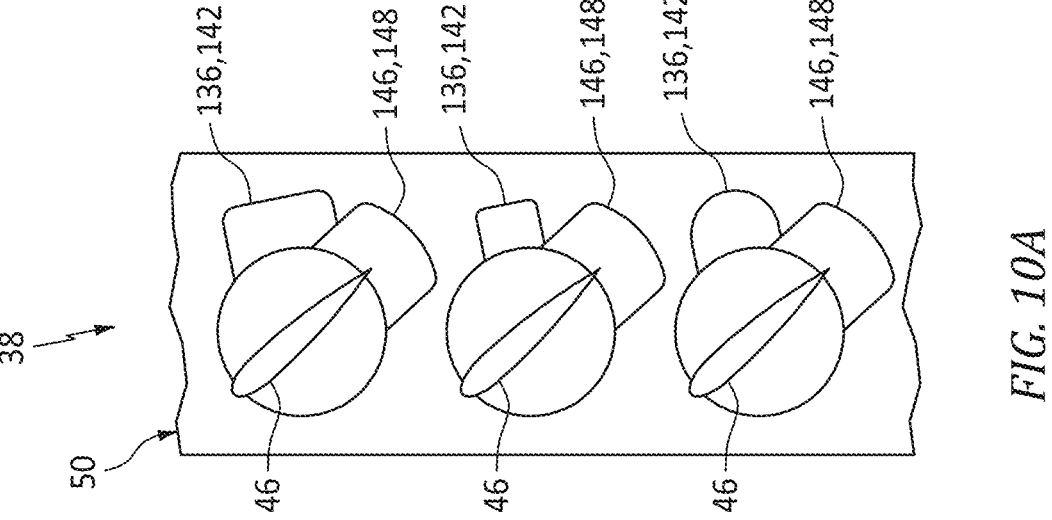
Figure 11A:
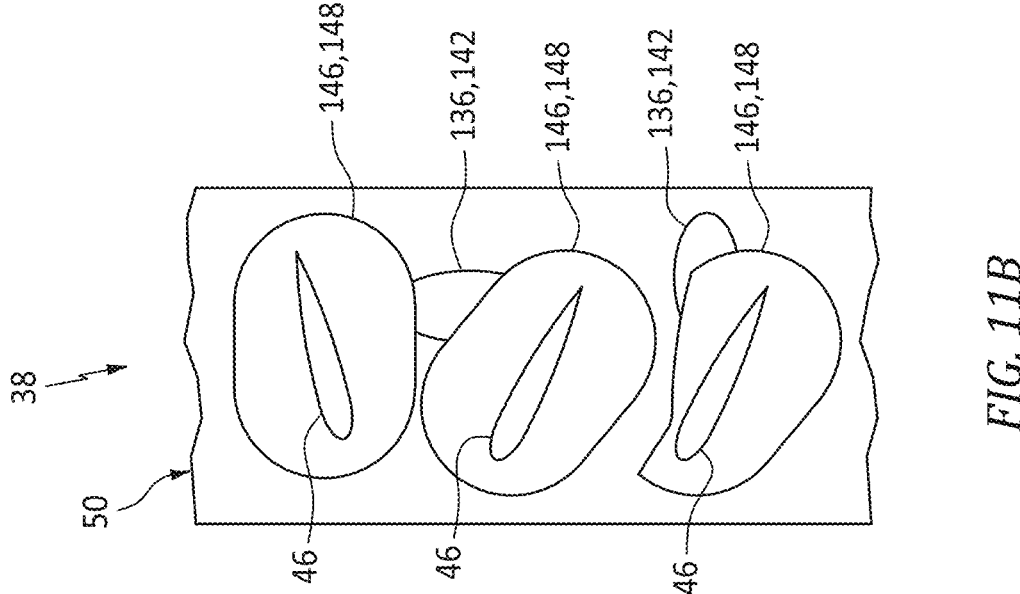
FIGS. 11A and 11B are plan view illustrations of a portion of the open propulsor rotor configured with alternate flowpath regulators.
Figure 11B:
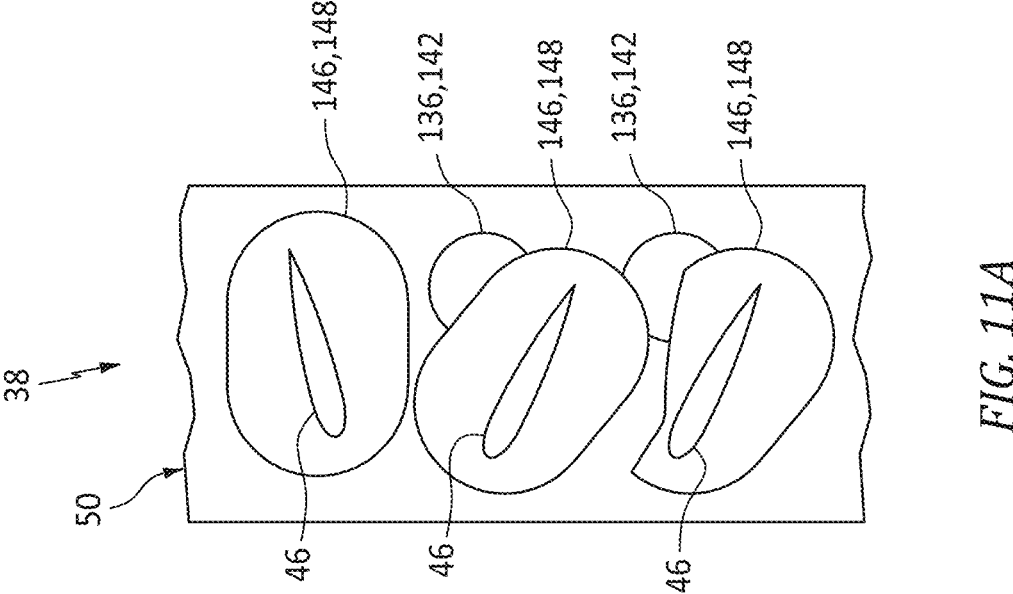
Figures 12A, 12B, 12C:
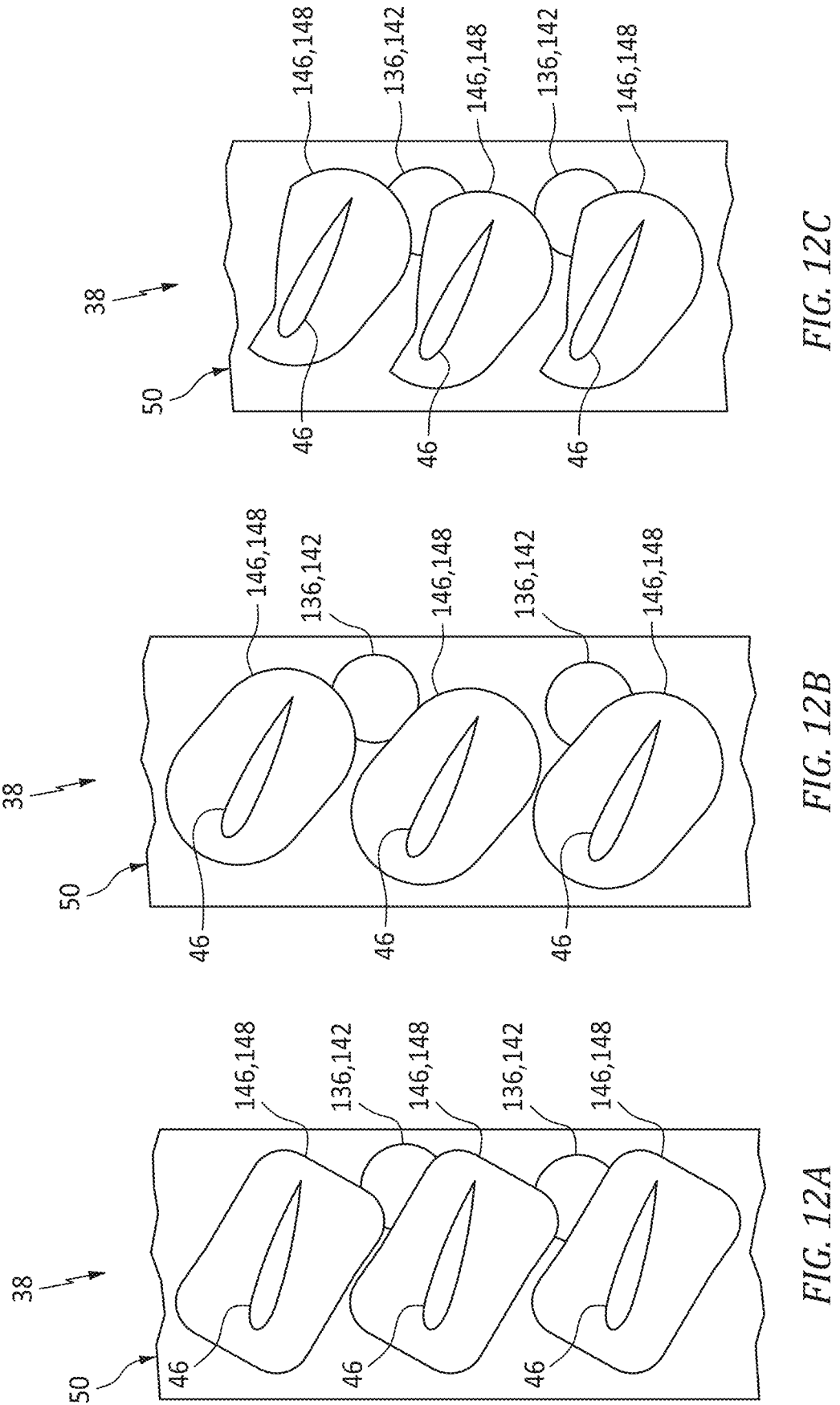
FIGS. 12A-C are plan view illustrations of a portion of the open propulsor rotor configured with still alternate flowpath regulators.
Figure 13B:
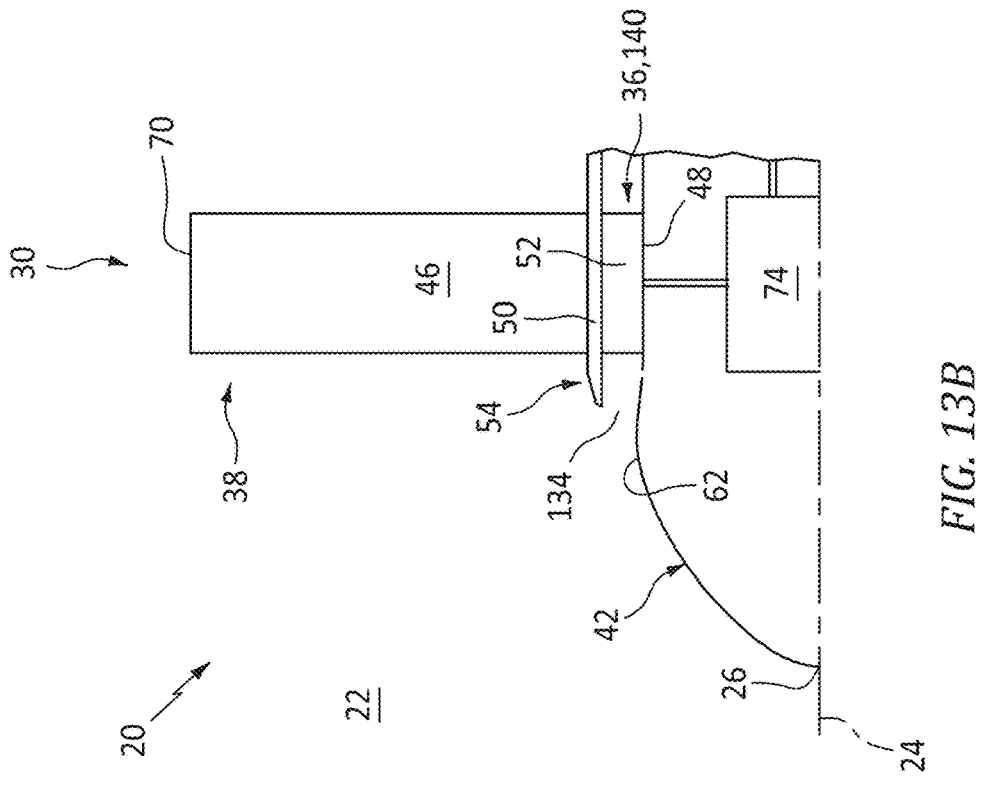
FIGS. 13A-D are partial schematic illustrations of a portion of the aircraft propulsion system at the propulsion section with various nose cone and rotating inlet duct arrangements.
Figure 13A:
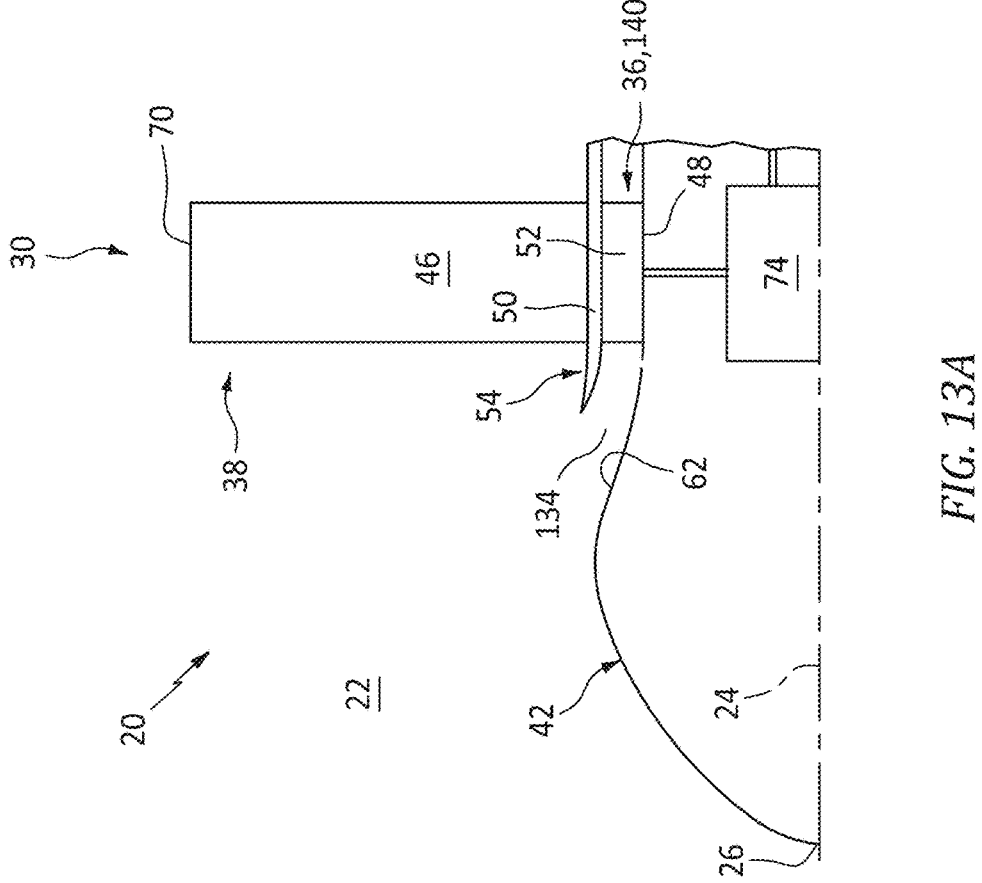
Figures 13C, 13D:
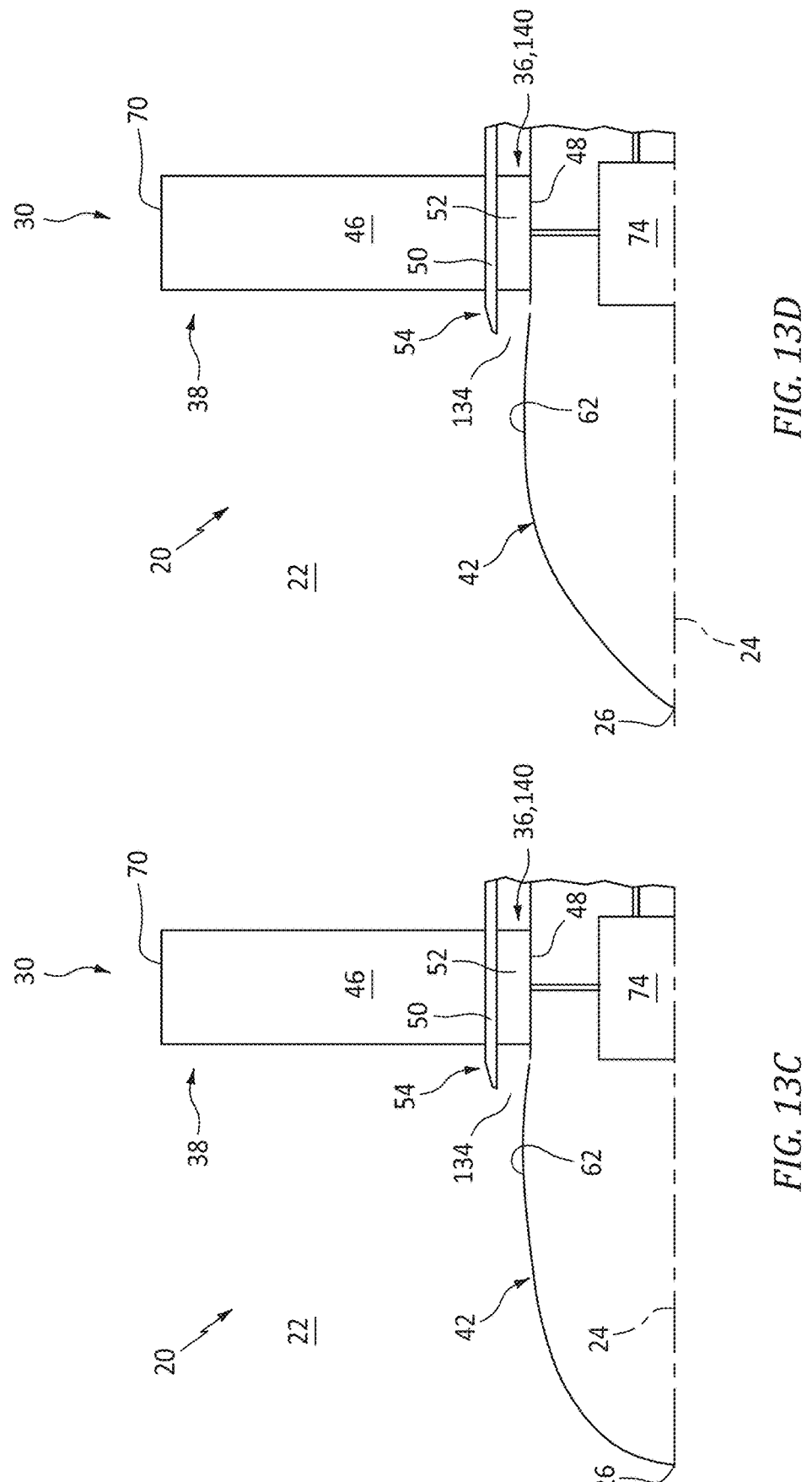

In some embodiments, referring to FIGS. 4A-C, all of the downstream side flowpath inlets 136 may be provided with a common (the same) configuration; e.g., location, geometry including shape and size, etc. All of the regulator doors 148 may also or alternatively be provided with a common (the same) configuration; e.g., location, geometry including shape and size, etc. The present disclosure, however, is not limited to such an exemplary arrangement. For example, referring to FIGS. 10A and 10B, some or all of the downstream side flowpath inlets 136 may be provided with different configurations; e.g., locations, geometries including shapes and/or sizes, etc. Of course, it is contemplated any one of the downstream side flowpath inlet configurations shown in FIGS. 10A and 10B may alternatively be used for embodiments where all of the downstream side flowpath inlets 136 have a common configuration. In another example, referring to FIGS. 11A and 11B, some or all of the regulator doors 148 may be provided with different configurations; e.g., locations, geometries including shapes and/or sizes, etc. Of course, it is contemplated any one of the regulator door configurations shown in FIGS. 11A and 11B may alternatively be used for embodiments where all of the regulator doors 148 have a common configuration. Other examples of suitable regulator door and downstream side flowpath inlet configurations are shown in FIGS. 12A-C.

Referring to FIGS. 13A-D, the nose cone 42 and/or the propulsor outer wall 50 may be provided with various configurations in order to tune, for example, upstream end flowpath inlet performance during the forward thrust mode (s) of operation. Here, the nose cone configuration and/or the propulsor outer wall configuration may also be selected to reduce likeliness for debris ingestion into the engine flowpath 36.

The turbine engine 32 of FIG. 1 is described above with a particular two rotating structure arrangement. The present disclosure, however, is not limited to such an exemplary arrangement. For example, the LPC rotor 112 may be omitted to configure the LPT rotor 115 as a power turbine (PT) rotor for the propulsor rotor 38. In another example, the turbine engine 32 may also include another rotating structure; e.g., an intermediate speed spool for the engine core 94.

The guide vane structure 40 is described above as a fixed (e.g., non-rotatable) guide vane structure. It is contemplated, however, the guide vane structure 40 may alternatively be selectively rotatable about the propulsion system axis 24. With such an arrangement, the aircraft propulsion system 20 may be configured as an open rotor propulsion system with a swirl recovery blade (SRB) open rotor architecture. More particularly, the aircraft propulsion system 20 may operate as: (A) a counter-rotating open rotor (CROR) propulsion system during a dual rotor mode of operation (e.g., when both the propulsor rotor 38 and the structure 40 are counter-rotating about the propulsion system axis 24); and (B) a single open rotor and swirl recovery vane (SRV) propulsion system during a single rotor mode of operation (e.g., when the propulsor rotor 38 is rotating and the structure 40 is rotationally fixed about the propulsion system axis 24). Note, when the guide vane structure 40 is configured to selectively rotate about the propulsion system axis 24, the moving guide vanes 76 operate as propulsor blades.

The aircraft propulsion system 20 of FIG. 1 and its propulsion section 30 are described as including the guide vane structure 40 with an SRV or SRB configuration. The present disclosure, however, is not limited to such an exemplary propulsion system configuration. For example, the aircraft propulsion system 20 may alternatively be configured without an open guide vane structure. The aircraft propulsion system 20 may thereby be configured as a single rotor (SR) open rotor propulsion system. In another example, the aircraft propulsion system 20 may be configured with a set of the open propulsor rotors (e.g., counter-rotating propulsor rotors) operatively coupled to the turbine engine 32 (see FIG. 1) through the geartrain 128. The aircraft propulsion system 20 may thereby be configured as a counter-rotating open rotor (CROR) propulsion system.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A propulsion system for an aircraft, comprising:
an open propulsor rotor including a plurality of open propulsor blades arranged circumferentially about a propulsion system axis, each of the plurality of open propulsor blades disposed in an environment external to the propulsion system;
an engine core configured to drive rotation of the open propulsor rotor about the propulsion system axis, the engine core including a compressor section, a combustor section and a turbine section;
an engine flowpath including an end flowpath inlet, a side flowpath inlet and a flowpath exhaust, the engine flowpath extending longitudinally through the compressor section, the combustor section and the turbine section from the end flowpath inlet to the flowpath exhaust, and the side flowpath inlet disposed to a radial outer side of the engine flowpath longitudinally between the end flowpath inlet and the compressor section; and a flow regulator configured to regulate a flow of air from the environment external to the propulsion system into the engine flowpath through the side flowpath inlet;

wherein the plurality of open propulsor blades are disposed axially between the end flowpath inlet and the side flowpath inlet along the propulsion system axis.

2. The propulsion system of claim 1, wherein the end flowpath inlet is an annular inlet extending circumferentially around the propulsion system axis.

3. The propulsion system of claim 1, wherein a leg of the engine flowpath projects axially along the propulsion system axis into the propulsion system from the end flowpath inlet.

4. The propulsion system of claim 1, wherein a leg of the engine flowpath projects radially inward towards the propulsion system axis into the propulsion system from the side flowpath inlet.

5. The propulsion system of claim 1, wherein the side flowpath inlet is one of a plurality of side flowpath inlets into the engine flowpath, the plurality of side flowpath inlets are arranged circumferentially about the propulsion system axis, and each of the plurality of side flowpath inlets is disposed to the radial outer side of the engine flowpath longitudinally between the end flowpath inlet and the compressor section.

6. The propulsion system of claim 5, wherein the flow regulator is one of a plurality of flow regulators, and each of the plurality of flow regulators is configured to regulate a respective flow of the air from the environment external to the propulsion system into the engine flowpath through a respective one of the plurality of side flowpath inlets.

7. The propulsion system of claim 6, wherein the plurality of flow regulators include a first flow regulator and a second flow regulator;

the first flow regulator comprises a first door with a first geometry, and the first door is configured to selectively cover and uncover a first of the plurality of side flowpath inlets;

the second flow regulator comprises a second door with a second geometry, and the second door is configured to selectively cover and uncover a second of the plurality of side flowpath inlets; and the second geometry is different than the first geometry.

8. The propulsion system of claim 6, wherein at least two of the plurality of flow regulators comprises a door with a common geometry, and the door of each of the at least two of the plurality of flow regulators is configured to selectively cover and uncover the respective one of the plurality of side flowpath inlets.

9. The propulsion system of claim 6, further comprising an actuation system operatively coupled to the plurality of flow regulators, the actuation system configured to actuate the plurality of flow regulators to synchronously open and close the plurality of side flowpath inlets.

10. The propulsion system of claim 6, further comprising an actuation system operatively coupled to the plurality of flow regulators, the actuation system configured to actuate the plurality of flow regulators to asynchronously open and close at least two of the plurality of side flowpath inlets.

11. The propulsion system of claim 5, wherein the plurality of side flowpath inlets include a first side flowpath inlet and a second side flowpath inlet, the first side flowpath inlet has a first geometry, and the second side flowpath inlet has a second geometry that is different from the first geometry.

12. The propulsion system of claim 5, wherein at least two of the plurality of side flowpath inlets have a common geometry.

13. The propulsion system of claim 1, wherein the flow regulator comprises a door configured to selectively cover and uncover the side flowpath inlet; and the door is adjacent to a first of the plurality of open propulsor blades.

14. The propulsion system of claim 1, wherein the flow regulator comprises a door configured to selectively cover and uncover the side flowpath inlet; and the door is adjacent a first of the plurality of open propulsor blades, and the door is operatively independent of each of the plurality of open propulsor blades.

15. The propulsion system of claim 1, further comprising:

an open guide vane structure including a plurality of open guide vanes, each of the plurality of open guide vanes disposed in the environment external to the propulsion system;

the side flowpath inlet disposed axially between the plurality of open propulsor blades and the open guide vane structure along the propulsion system axis.

16. The propulsion system of claim 1, further comprising an actuation system configured to actuate the flow regulator such that the flow regulator blocks the flow of the air from the environment external to the propulsion system into the engine flowpath through the side flowpath inlet when the open propulsor rotor is configured to provide forward thrust; and unblocks the flow of the air from the environment external to the propulsion system into the engine flowpath through the side flowpath inlet when the open propulsor rotor is configured to provide reverse thrust.

17. A propulsion system for an aircraft, comprising:

an open propulsor rotor including a plurality of open propulsor blades arranged circumferentially about a propulsion system axis, each of the plurality of open propulsor blades disposed in an environment external to the propulsion system;

an engine core configured to drive rotation of the open propulsor rotor about the propulsion system axis, the engine core including a compressor section, a combustor section and a turbine section;

an engine flowpath including an end flowpath inlet, a side flowpath inlet and a flowpath exhaust, the engine flowpath extending longitudinally through the compressor section, the combustor section and the turbine section from the end flowpath inlet to the flowpath exhaust, and the side flowpath inlet disposed to a radial outer side of the engine flowpath longitudinally between the end flowpath inlet and the compressor section; and a flow regulator configured to regulate a flow of air from the environment external to the propulsion system into the engine flowpath through the side flowpath inlet;

wherein the flow regulator comprises a door configured to selectively cover and uncover the side flowpath inlet; and wherein the door is operatively coupled to a first of the plurality of open propulsor blades.

18. The propulsion system of claim 17, wherein a leg of the engine flowpath projects axially along the propulsion system axis into the propulsion system from the end flowpath inlet.

19. The propulsion system of claim 17, wherein a leg of the engine flowpath projects radially inward towards the propulsion system axis into the propulsion system from the side flowpath inlet.

20. A propulsion system for an aircraft, comprising:

an open propulsor rotor including a plurality of open propulsor blades arranged circumferentially about a propulsion system axis, each of the plurality of open propulsor blades disposed in an environment external to the propulsion system;

an engine core configured to drive rotation of the open propulsor rotor about the propulsion system axis, the engine core including a compressor section, a combustor section and a turbine section;

an engine flowpath including a flowpath inlet and a flowpath exhaust, the engine flowpath extending longitudinally through the compressor section, the combustor section and the turbine section between the flowpath inlet and the flowpath exhaust; and a flow regulator configured to close the flowpath inlet into the engine flowpath from the environment external to the propulsion system when the open propulsor rotor is configured to provide forward thrust; and open the flowpath inlet into the engine flowpath from the environment external to the propulsion system when the open propulsor rotor is configured to provide reverse thrust.

\* \* \* \* \*